United States Patent [19]

Chittineni

[11] Patent Number: 4,747,054

[45] Date of Patent: May 24, 1988

[54] METHOD FOR NON-LINEAR SIGNAL MATCHING

[75] Inventor: Chittibabu Chittineni, Ponca City, Okla.

[73] Assignee: Conoco Inc., Ponca City, Okla.

[21] Appl. No.: 675,738

[22] Filed: Nov. 28, 1984

[51] Int. Cl.$^4$ ............................ G01V 1/36; G01V 1/30
[52] U.S. Cl. ...................................... 364/421; 364/604; 367/40; 367/75
[58] Field of Search ............... 364/421, 822, 414, 821, 364/604, 861; 324/80; 333/150; 367/40, 59, 75

[56] References Cited

U.S. PATENT DOCUMENTS

| | | | |
|---|---|---|---|
| 3,931,509 | 1/1976 | Otto | 364/821 |
| 4,037,174 | 7/1977 | Moore et al. | 364/821 X |
| 4,037,190 | 7/1977 | Martin | 364/821 X |
| 4,041,419 | 8/1977 | Desormieé et al. | 364/821 X |
| 4,114,116 | 9/1978 | Reeder | 364/821 X |
| 4,117,480 | 9/1978 | Boario | 342/189 |

Primary Examiner—Jerry Smith
Assistant Examiner—Charles B. Meyer

[57] ABSTRACT

A process for non-linear matching of time analog signals, particularly seismic signals, that have generally similar response characteristics but different time bases is disclosed. The process models the signals to be matched as a stretched version of each signal with additive noise, and a match curve is estimated adhering to a global criterion of maximization of the likelihood function. The global criterion is further optimized in accordance with the principle of path optimality and other a priori information may also be considered. The match curve may then be used to identify such as correlated signal events, conparison of signal sections, and numerous seismic data processing functions using multidata or multisensor time analog data input.

23 Claims, 17 Drawing Sheets

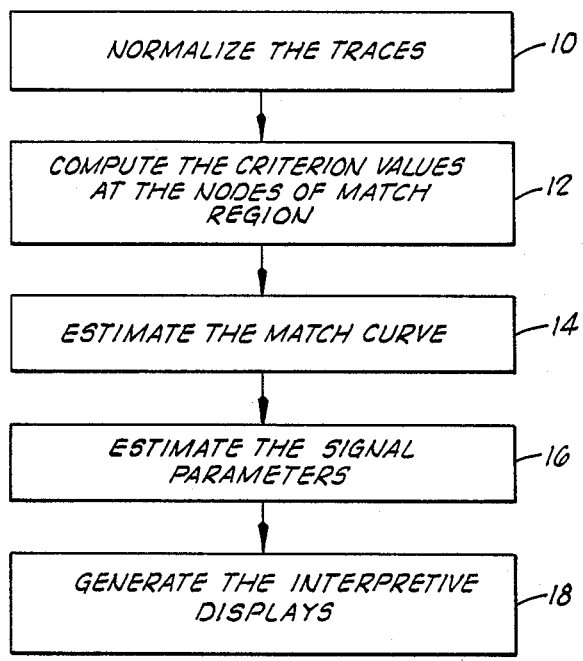
FIG. 1
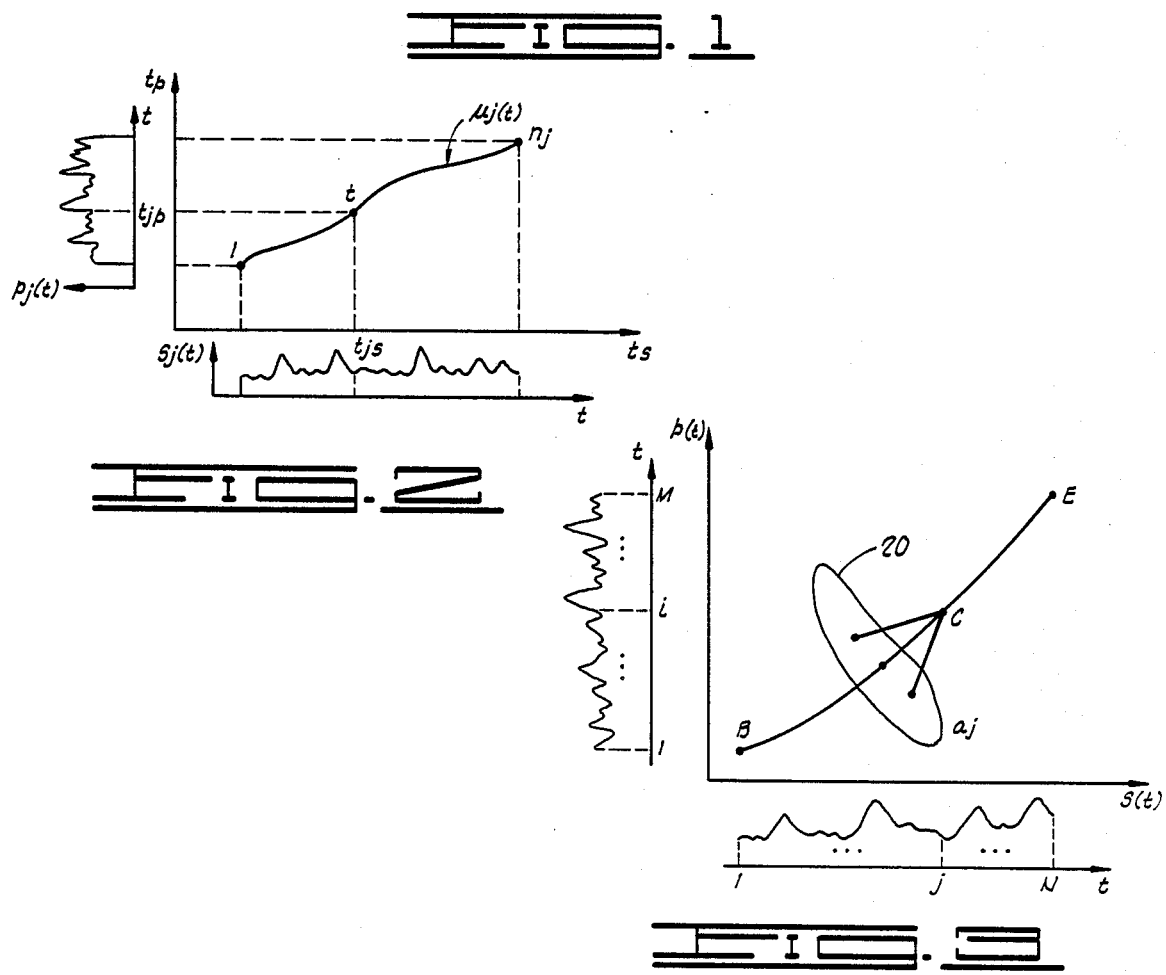
FIG. 2
FIG. 3

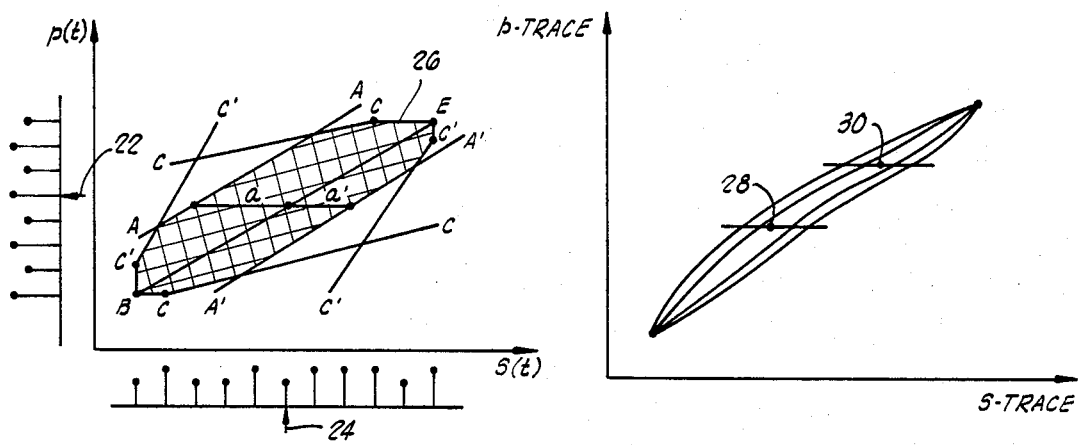
 
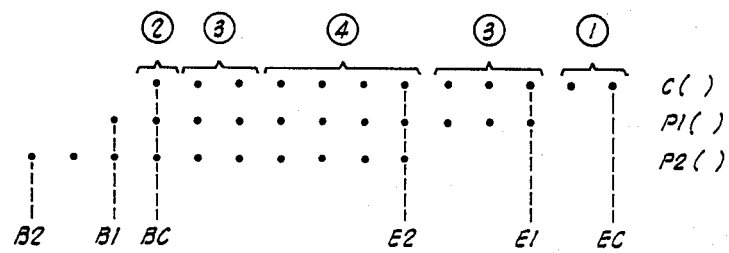
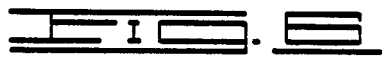
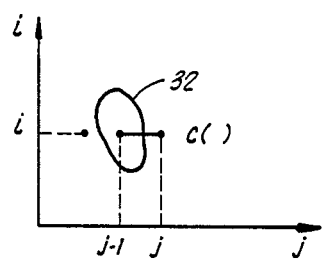 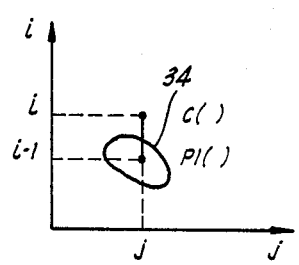 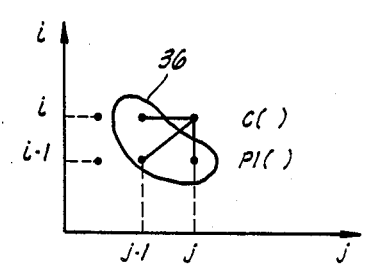
  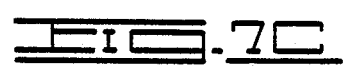
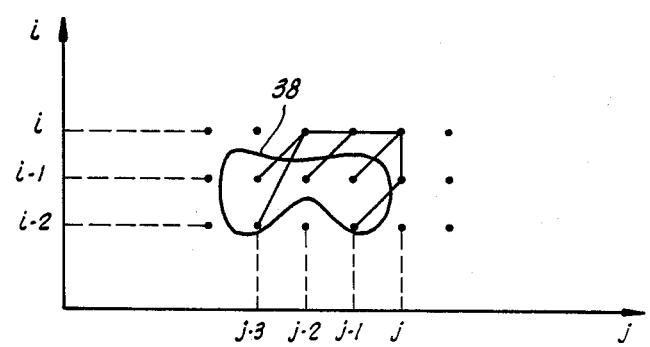
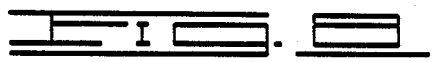

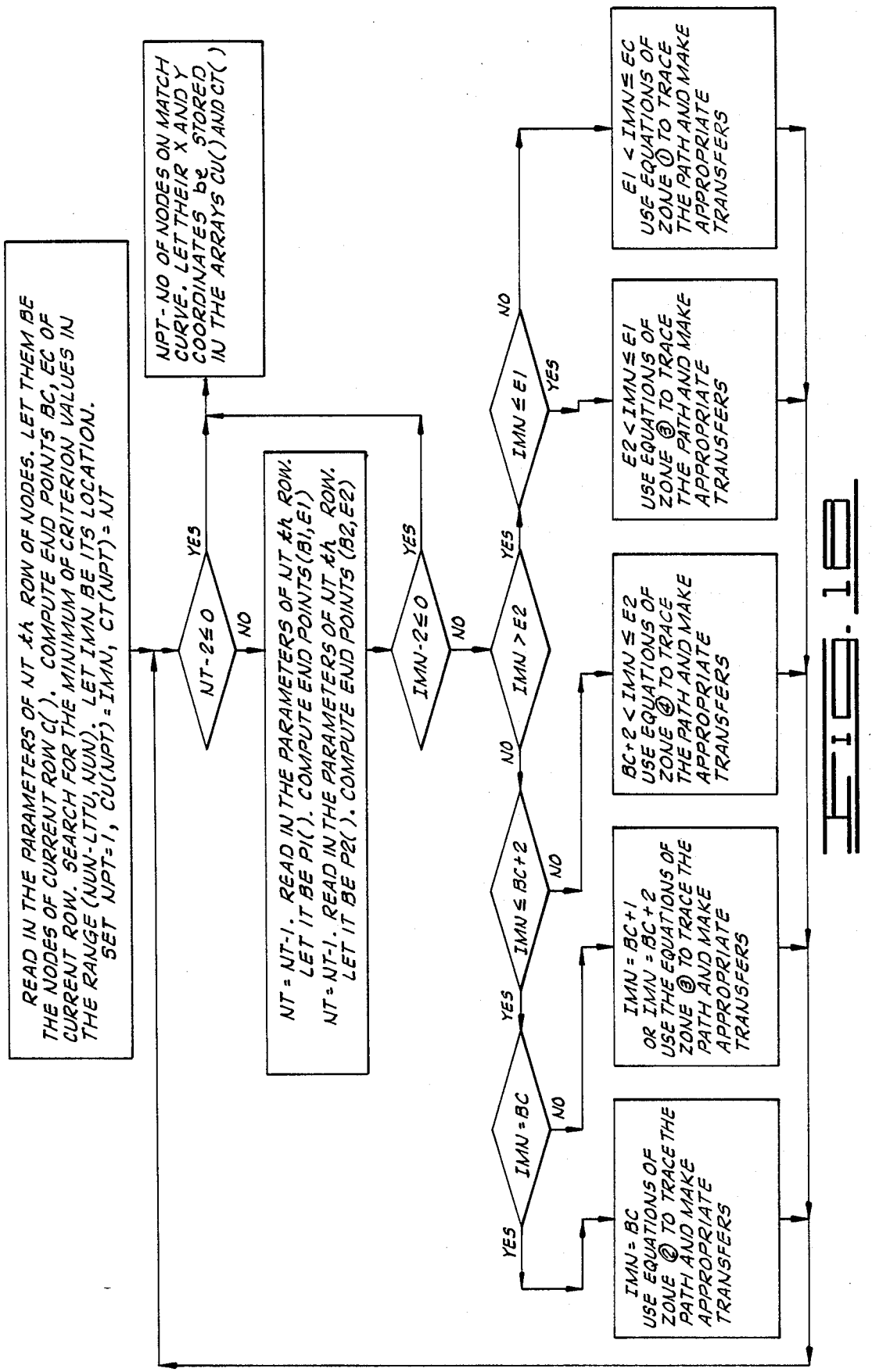

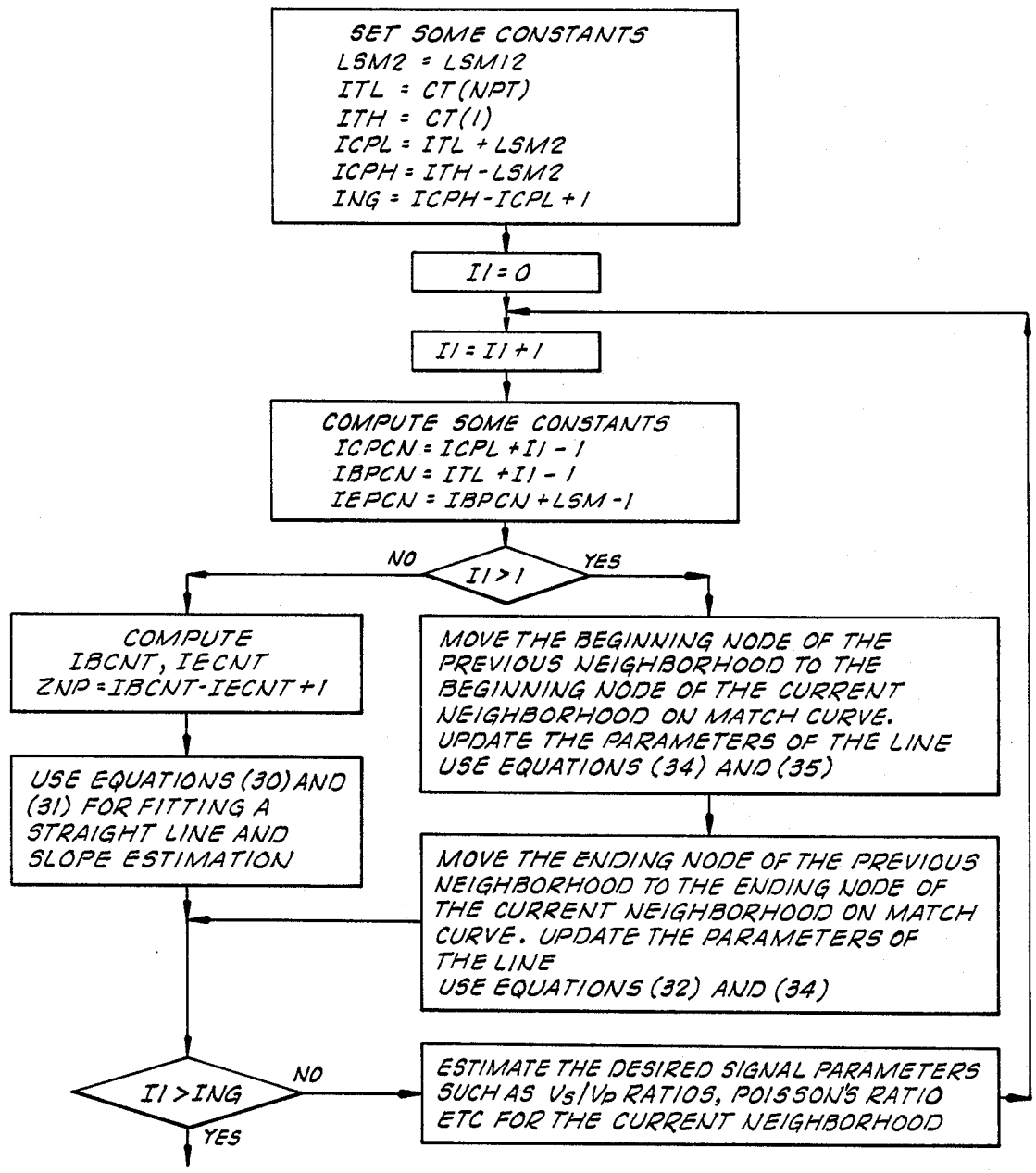
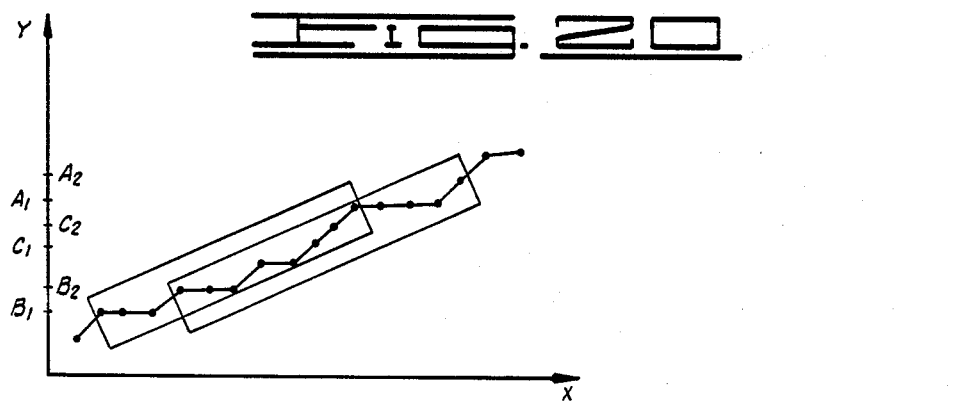
FIG. 20
FIG. 19

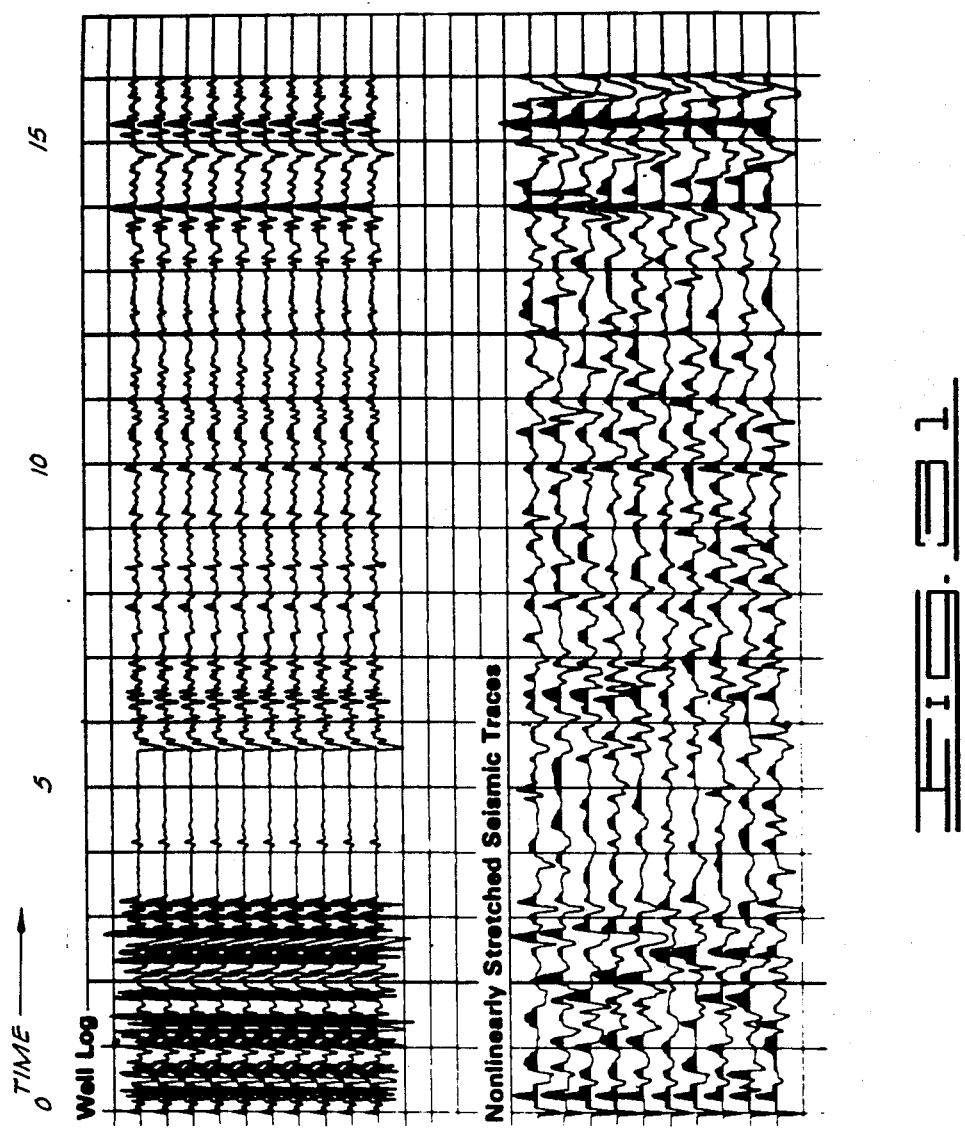

METHOD FOR NON-LINEAR SIGNAL MATCHING

BACKGROUND OF THE INVENTION

1. Field of the Invention

The present invention relates generally to alternating signal pattern recognition systems and, more particularly but not by way of limitation, it relates to an improved signal processing system for comparison of non-linearly, related geosignals to extract maximum information therefrom.

2. Description of the Prior Art

Recent developments in the seismic prospecting technology have seen extensive development of techniques and computer processes for integrated processing of compressional wave data, shear wave data and/or mode converted data in order to derive additional parameter data therefrom. For example, it has been a primary quest to process seismic shear wave data and compressional wave data for the same terrain, albeit that energy velocities differ, in order to solve for $V_s/V_p$ ratios which have a direct relationship with Poisson's ratio and other earth properties. Seismic shear wave data can provide an added dimension to compressional wave data to enable better, more accurate prediction of the properties of an earth cross-section and identification of the lithologies. Of particular interest is the publication of S. N. Domenico, "Rock Lithology and Porosity Determination From Shear and Compressional Wave Velocity", Geophysics, Vol. 49, 1984, pp 1188-1195. This paper discusses fully the usefulness of $V_s/V_p$ ratios and shear wave velocities for the identification of lithologies.

An estimate of the $V_s/V_p$ ratios is obtained when corresponding events in both the compressional and shear wave can be matched. This requires a time equalization of the counterpart waves as discussed by P. Anno, "Static Solutions and Event Correlations—Two Critical Aspects of Shear Wave Exploration", PROC. 53rd Annual SEG Meeting, 1983, p 347-349.

Yet another disclosure of interest is that of McCormack, Dunbar and Sharp, "A Case Study of Stratigraphic Interpretation Using Shear and Compressional Seismic Data", Geophysics, Vol. 49, 1984, pp 509-520, which teaches the matching of events for either or both of shear and compressional seismic sections using area well data to generate synthetic traces for comparison with the seismic traces. Finally, the patent art is best exemplified by U.S. Pat. No. 4,422,165 in the name of Thomas et al entitled "Maximum Likelihood Estimation of the Ratio of the Velocities of Compressional and Shear Waves". This teaching is directed to derivation of $V_s/V_p$ data by linearly time equalizing shear and compressional wave data for subsequent maximum likelihood estimation. Thomas et al teach a computer-aided process for linear signal matching as directly correlated comparisons are made.

SUMMARY OF THE INVENTION

The present invention is a process for defining similarities and differences between two signals that carry common information but that have undergone differing response mechanisms. The non-linear signal matching process may be utilized for examination of any two signals that result from different responses to the same or similar medium. For example, the process is particularly applicable to signal matching of seismic shear and compressional wave data for an earth cross-section wherein the signal counterparts have distinct velocity contrasts as well as non-linearities introduced by move out and spacing irregularities. The non-linear signal matching matches the signals by using the quality of global match in terms of measures of local similarities as a criterion to guide the local stretch or compression of the counterpart wave or signal.

Signals to be matched, e.g. seismic shear and compressional waves for a selected subterrain, are modeled as stretched versions of each other with an additive noise. Maximization of the likelihood function is used as a global criterion for the estimation of a match curve. The principle of path optimality is then employed for efficiently estimating the match curve by the optimization of the global criterion. A priori information about the nature of the signals to be matched is incorporated into the estimation problem is putting constraints on the local slopes of the match curve and the region through which the optimal match curve passes. Information such as visual clues, stratigraphic clues, identified horizons from well data of signals to be matched, etc., may be incorporated into the match curve estimation by constraining it to pass through intermediate checkpoints either precisely or within specified limits.

The match curve possesses information about the correlated events such as relative travel times, and velocities of the matched signals. The data is then processed to estimate continuous signal parameter data for subsequent section comparison, event comparison and the like. Interpretive output displays may be generated in any of various formats with attendant color overlays to further highlight parameter limits or zones of interest.

Therefore, it is an object of the present invention to develop a technique for matching multicomponent, multisensor signals that represent the same or similar physical phenomenan by estimating the optimal match curve that relates the time axis of one of the signals with the time axis of the other signal.

It is also an object of the invention to generate a match curve as between non-linearly related seismic signals for estimating continuously the signal properties for such as $V_s/V_p$ ratios that are indicators of exploration targets.

It is a further object of the invention to use a match curve derived from non-linearly related seismic signals to generate interpretive displays such as signal comparison displays, correlated signal slice plots and color overlays of extracted continuous signal properties.

Finally, it is an object of the invention to process related seismic, compressional and/or mode converted data to aid in the general interpretive process by providing a computer-aided method for the detection of pinchouts, horizon continuities, as well as for other related signal matching and tying functions.

Other objects and advantages of the invention will be evident from the following detailed description when read in conjunction with the accompanying drawings which illustrate the invention.

BRIEF DESCRIPTION OF THE DRAWINGS

FIG. 1 is a general flow diagram illustrating the major computational steps of the invention;

FIG. 2 is a graph illustrating a trace model and related match curve;

FIG. 4 is a graph illustrating a match region and the use of global constraints for match curve estimation;

FIG. 5 is a graph illustrating the concept of checkpoints;

FIG. 6 is a zone layout illustrating the nodes for different zones of a current row in the match region for sequential optimal path propagation;

FIGS. 7 A, B and C illustrate local search regions for nodes in each of zones 1, 2, and 3;

FIG. 8 is a graph showing the local search region for nodes in zone 4;

FIG. 9 is a flow chart used for the computation of cost of optimal path to the nodes of a match region;

FIG. 18 is a flow chart for tracing the optimal match curve through the match region;

FIG. 19 illustrates the continuous estimation of the slope of a match curve by moving the operator along the Y-axis;

FIG. 20 is a flow chart for continuous estimation of the slope of a match curve with the operator moving along the Y-axis;

FIG. 31 illustrates the results of non-linearly stretched seismic traces in matching relationship with a sonic log.

DETAILED DESCRIPTION OF THE INVENTION

Figure 3:
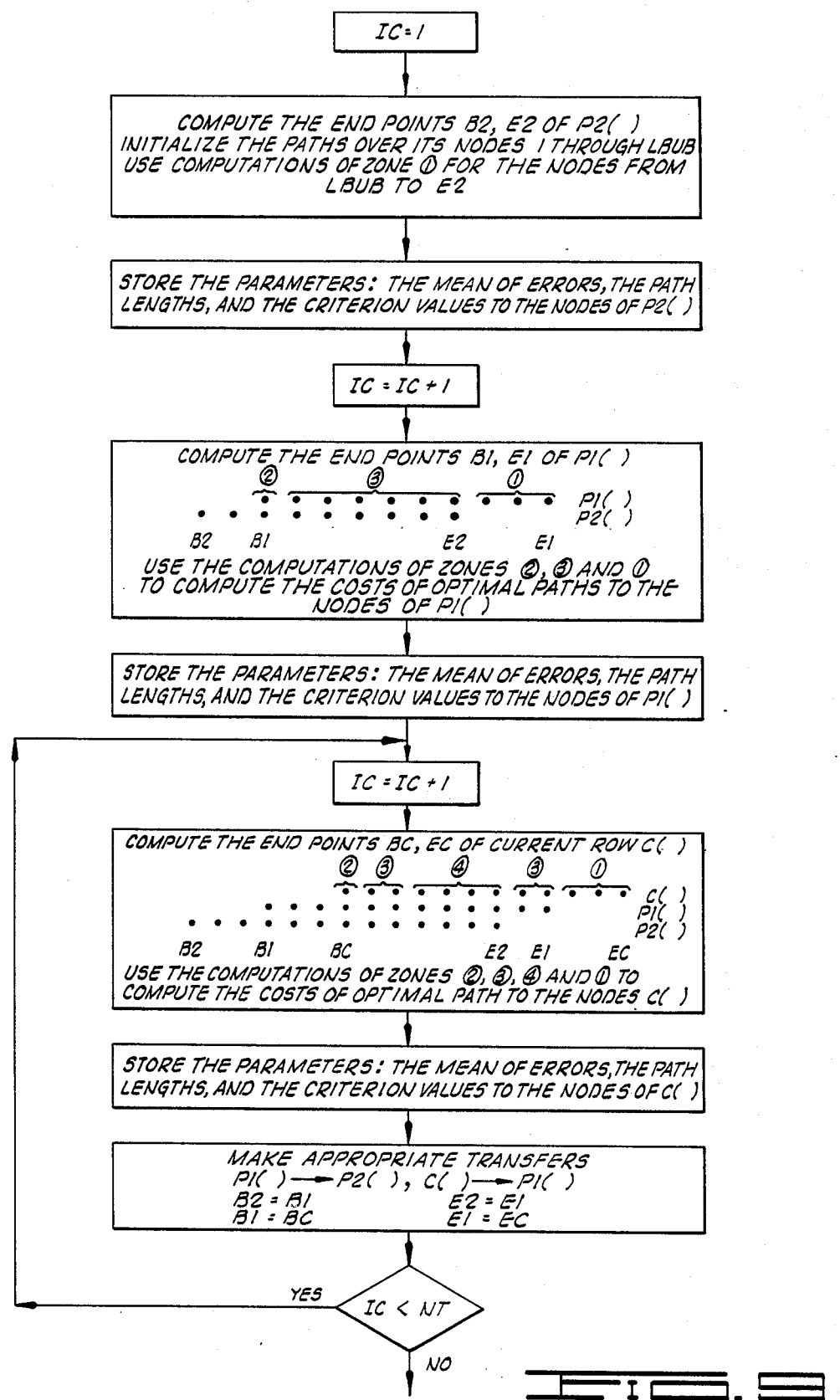
FIG. 3 is a graph illustrating a local search region between beginning and ending points and the use of path optimality.

All of the prior methods for making measurements of $V_s$ and $V_p$ relationships by comparing shear and compressional data can be thought of in terms of using a pair of dividers. The usefulness of $V_s/V_p$ ratios is severely limited unless they can be continuously estimated by moving the measurement zones across the zone of interest. This requires continuous correlation of signal segments across the zone of interest and it is difficult for present approaches to correlate signal segments that do not have end points at specific events such as peaks or troughs. Any kind of structure in the sections renders the matching extremely difficult. The prior approaches do not effectively utilize the a priori information in matching the signals. These difficulties are overcome by the present method by automatically matching non-linearly related signals and extracting maximum information therefrom.

FIG. 1 illustrates in flow chart form the major computational steps of the process of the present invention. Input traces to be utilized, e.g. compressional wave and shear wave data or compressional wave and converted shear wave data, are first normalized in flow stage 10. The output from stage 10 yields samples of traces for use in computation of the match curve. At flow stage 12, criterion values for the nodes of a match region are computed and flow stage 14 functions to estimate the match curve by optimizing the global criterion. The principal of path optimality is used to maintain computational efficiency. Data out from stage 14 is then applied in flow stage 16 as the match curve is used to estimate various parameters that are descriptive of signal properties such as $V_s/V_p$ ratios, Poisson's ratio, etc. Flow stage 18 may also be called upon to generate various interpretive displays such as correlated signal slice display, displays of continuous estimated signal parameters in color overlay on seismic sections, displays for the comparison of signals, etc.

Flow stage 10 effects normalization of signals to be processed. In the example of the present application, these are seismic signals in seismic section array, and non-linear signal matching may be carried out relative to any of compressional and shear or mode converted seismic waves. Additionally, signal matching may be carried out relative to information derived from well-log data or other response medium which has undergone similar time analog stimulation.

Signal matching may be carried out without normalization but in most cases normalization definitely enhances output result. When the difference between the lengths of comparison signals is larger than can be allowed by the range of local slopes, one of the signals can be uniformly expanded or compressed to bring the signal length difference to within the range of local slopes. A four-point cubic spline approximation to $$\frac{\text{Sin } X}{X}$$

may be used to uniformly expand or compress one of the signals. An interpolating function h(x) can be written as $$h(x) = \begin{cases} X^3 - 2X^2 + 1 & 0 \leq X < 1 \\ -X^3 + 5X^2 - 8X + 4 & 1 \leq X < 2 \\ 0 & 2 \leq X \end{cases} \quad (1)$$

and $h(x) = h(-x)$. The value of the signal $S(t)$ at time $t$ can be interpolated using the convolution formula:

$$S(t) = \sum_x S(x) h(t-x) \quad (2)$$

The comparison signals can then be further normalized by bringing the absolute maximum amplitudes of the signals to unity. One way in which this can be achieved is by finding the absolute maximum of the signal and dividing each signal's sample value by its absolute maximum. The smoothing of the signals may then be achieved either by computing the signal Hilbert envelope or by applying a local smoothing operator in the neighborhood of the sample point under consideration.

Flow stage 12 (FIG. 1) functions to compute the criterion values for a match region. Stage 12 employs a computationally efficient procedure in sequentially estimating the criterion value and the optimal path to every node of the match region.

To establish the criterion for signal matching, we first consider a set of J pairs of signals $\{S_j(t), p_j(t), j \in J\}$. The signals in each pair are a non-linearly stretched version of the other. Let the signal $S_j(t)$ be modeled in terms of $p_j(t)$ as $$S_j(t_{js}) = p_j(t_{jp}) + e_j(t), \, j \in J \quad (3)$$

where $t_{jp}$ and $t_{js}$ are related through a stretch function or match curve $\mu_j(t)$, and $e_j(t)$ is an additive noise term. As shown in FIG. 2, place the trace $p_j(t)$ on the y-axis and traces $S_j(t)$ on the x-axis. The times $t_{js}$ and $t_{jp}$ are the x- and y- coordinates of a node $t$ on the match curve $\mu_j(t)$ and $n_j$ is the number of nodes on the match curve.

Letting $e_j(t)$ be Gaussian with the mean of $\alpha_j$ and the variance $\sigma_j^2$. That is $$e_j(t) \sim N(\alpha_j, \sigma_j^2) \quad (4)$$

let it also be independent from sample to sample and from trace to trace. The likelihood function of the data in the J pairs of traces under the model of equation (3) can then be written as $$L(\mu_j(t), \alpha_j, \sigma_j^2; j \in J) = -\sum_j \left[ \frac{n_j}{2} \log \sigma_j^2 + \frac{1}{2\sigma_j^2} \sum_t (e_j(t) - \alpha_j)^2 \right] + \text{a constant} \quad (5)$$

where $n_j$ is the number of points or nodes on the match curve $\mu_j(t)$ and $k$ is a constant. Then, with differentiation of L of equation (5) with respect to $\alpha_j$ and $\sigma_j$ and equating the resulting expression to zero, we get $$\hat{\alpha}_j = \frac{1}{n_j} \sum_t e_j(t) \quad (6)$$

and $$\hat{\sigma}_j^2 = \frac{1}{n_j} \sum_t (e_j(t) - \hat{\alpha}_j)^2$$

substitution of equation (6) into equation (5) then yields an expression for the log likelihood function in terms of the match curve $\mu_j(t)$. That is $$L1(\mu_j(t), j \in J) = -\sum_j \frac{n_j}{2} \log \left[ \frac{1}{n_j} \sum_t (e_j(t) - \hat{\alpha}_j)^2 \right] - \sum_j \frac{n_j}{2} + \text{a constant} \quad (7)$$

The match curve $\mu_j(t)$ that maximizes equation (7) is the maximum likelihood estimate. Assuming that the match curve is constant for the J pairs of traces, equation (7) can then be written as $$L2(\mu(t)) = -\sum_j \frac{n}{2} \log \left[ \frac{1}{n} \sum_t (e_j(t) - \hat{\alpha}_j)^2 \right] - \left( \frac{nJ}{2} \right) + \text{a constant} \quad (8)$$

since the logarithm is a monotonic function of its argument, a criterion $\epsilon^2$ for the estimation of the match curve can be written as $$\epsilon^2 = \frac{1}{n} \sum_j \sum_t (e_j(t) - \hat{\alpha}_j)^2 \quad (9)$$

The match curve is estimated by the minimization of $\epsilon^2$. In particular, If we have only one pair of traces, a criterion for the estimation of the match curve $\mu(t)$ is given by the minimization of $\epsilon^2$, where $$\epsilon^2 = \frac{1}{n} \sum_t (e_j(t)) - \hat{\alpha}_j)^2 \quad (10)$$

Referring additionally to FIG. 3, we seek to establish a computationally efficient estimation of the match curve $\mu(t)$. Thus, with trace $p(t)$ on y-axis and the trace $s(t)$ on the x-axis, we seek to establish an optimal match curve. If we know the beginning sample of traces that match such as point B, and we know the ending samples of these traces that match as at Point E, any curve that passes through B and E will define a stretch of one trace relative to the other. Matching of the traces is equivalent to estimating a match curve that is optimal with respect to the criterion of equation (10).

The estimation of the match curve can also be viewed as finding a path from beginning point B to the ending point E that is optimal relative to a specific test or criterion. The principle of path optimality can be used to estimate the optimal match curve. It can be stated as follows. Refer to FIG. 3. If the optimal path from B to C goes through some intermediate point $a_j$, then the optimal path from B to C includes as a portion of it the optimal path from B to $a_j$. This can be used to propagate the path sequentially. Letting $\eta(B, C)$ be the minimum value of the criterion for the optimal path from B to C, and using the principle of path optimality, we may compute it in terms of the optimal paths from B to $a_j$ and the value of the criterion from $a_j$ to C as follows:

$$\eta(B,C) = \min_{a_j} f(\eta(B,a_j), \epsilon^2(a_j,c)) \quad (11)$$

The size and shape of a local search region 20 containing the intermediate points $a_j$ depend upon the a priori information that we establish about the range of local slopes on the match curve $\mu(t)$. If the difference between the length of signals is larger than can be allowed by the local constraints, it should be brought into the range of local slopes by preprocessing operations, e.g. uniform stretching or compression of one of the signals. Efficient expressions for the use of principle of path optimality of equation (11) with the criterion of equation (10) are given in the following.

Let the optimal path from the beginning node B to a node $a_j$ in the local search region 20 have n nodes. Let $e_i$, $1 \leq i \leq n$ be the errors computed at each of the nodes using equation (3). The estimates of the mean $\alpha$ and the criterion $\epsilon^2$ with n nodes on the path are given by $$\hat{\alpha}_n = \frac{1}{n} \sum_{i=1}^{n} e_i \quad (12)$$

and $$\hat{\epsilon}_n^2 = \frac{1}{n} \sum_{i=1}^{n} (e_i - \hat{\alpha}_n)^2 \quad (13)$$

We then seek to extend the optimal path to node C. Let there be m nodes between $a_j$ and node C, including the node C. Let $e_{n+i}$, $1 \leq i \leq m$ be the errors computed at each of these nodes. Let $\alpha_{n+m}$ and $\epsilon^2_{n+m}$ be the estimate of the mean $\alpha$ and the criterion $\epsilon^2$ with (n+m) nodes on the optimal path. These are related to $\alpha_n$ and $\epsilon^2_n$ as $$\hat{\alpha}_{n+m} = \hat{\alpha}_n + \Delta\hat{\alpha}_n \quad (14)$$

$$\hat{\epsilon}^2_{n+m} = \frac{n}{(n+m)} \hat{\epsilon}_n^2 + \frac{1}{(n+m)} \sum_{i=n+1}^{n+m} (e_i - \hat{\alpha}_n)^2 - (\Delta\hat{\alpha}_n)^2 \quad (15)$$

and $$\Delta\hat{\alpha}_n = \frac{1}{(n+m)} \sum_{i=n+1}^{n+m} (e_i - \hat{\alpha}_n) \quad (16)$$

The equations (12) through (16) together with (11) can be used to sequentially propagate the path in the optimal estimation of match curve (t).

Referring now to FIG. 4, we see how the global a priori information about the traces to be matched can be used in the estimation of a match curve by constraining the region through which the optimal match curve is expected to pass. The match curve obtained by linearly joining the beginning point B and the ending point E defines the uniform stretch of one signal relative to the other. In general, since the stretch between the signals p(t) and s(t) will not be uniform, and the P-sample indicated by the arrow 22 of FIG. 4 will be expected to match with a corresponding S-sample in a region around the sample, as indicated by the arrow 24. That is, the match curve should lie between the lines AA and A'A'. The uncertainty in the beginning and ending points B and E of the match curve can be minimized by allowing them to vary in the zones indicated as BC, BC' and EC, EC' respectively. There will be a minimum and a maximum slope that the match curve can have and this can be taken into account by constraining the match curve to lie between the lines C' C' and CC. Thus, putting all of the constraints together we find a match region (indicated in cross-hatch) in which one can search for the optimal match curve.

Referring to FIG. 5, still further information can be incorporated in the estimation of match curve by constraining it to pass through some intermediate checkpoints, either precisely or within some prespecified limits. Input of such information might arise from well-log data in the area or from visual and stratigraphic clues pertaining to such as thinning of beds, pinchouts, specific geological structures, etc. Thus, one or more additional checkpoints 28, 30 may be imposed with still further constraints to delimit the possible variances of the match curve to a greater extent.

The number of rows of a match region 26 to be considered at a given instant of time for the sequential propagation of optimal path depends on the size and shape of the local search region 20, as shown in FIG. 3. By way of example, there is presented here the computations involved for the range of local slopes, $\Omega$, $\frac{1}{2}$, $\frac{2}{3}$, 1 and 2. For this case, we need only to consider three rows of a match region 26 at a time. For other ranges of local slopes, the similar computations can readily be developed.

Let C( ), P1( ) and P2( ) be the three rows of a match region being considered with their beginning and ending points BC, B1, B2 and EC, E1, E2, respectively. Having previously computed the optimal paths to the nodes of the rows P1( ) and P2( ), the program then extends the optimal paths to the nodes of current row C( ). The nodes of row C( ) are divided into four zones as shown in FIG. 6. FIGS. 7A, 7B and 7C show the local search regions 32, 34 and 36 for the nodes in each of zones 1, 2 and 3 of row C( ). The nodes of row C( ) in these zones 1, 2 and 3 are at the boundaries of the total match region 26. FIG. 8 illustrates a local search region 38 of zone 4 nodes of row C( ). The use of equations (12) through (16) together with the principle of path optimality equation (11) in propagating the optimal path from the nodes of rows P1( ) and P2( ) to the zone 3 nodes of row C( ) is illustrated in the following.

Let e(i, j) be the error associated with the node (i,j) as calculated using equation (3). Then let n(i,j) be the number of nodes on the optimal path to the node (i,j). Let (i,j) be the estimated mean value of the errors at the nodes on the optimal path to node (i,j) and let n(i,j) be the value of the criterion for the optimal path to the node (i,j). Then, use of the principle of path optimality equation (11), and the updating of equations (12) through (16) in the propagation of an optimal path to a node (i,j) in zone 3 of row C( ) is described in the following.

$$\eta(i,j) = \min \begin{cases} \frac{n(i,j-1)}{(n(i,j-1)+1)} \eta(i,j-1) + \frac{1}{(n(i,j-1)+1)} (e(i,j) - \\ \hat{a}(i,j-1))^2 - \left(\frac{1}{(n(i,j-1)+1)} (e(i,j) - \hat{a}(i,j-1))\right)^2 \\ \frac{n(i-1,j-1)}{(n(i-1,j-1)+1)} \eta(i-1,j-1) + \frac{1}{(n(i-1,j-1)+1)} (e(i,j) - \\ \hat{a}(i-1,j-1))^2 - \left[\frac{1}{(n(i-1,j-1)+1)} (e(i,j) - \hat{a}(i-1,j-1))\right]^2 \\ \frac{n(i-1,j)}{(n(i-1,j)+1)} \eta(i-1,j) + \frac{1}{(n(i-1,j)+1)} (e(i,j) - \\ \hat{a}(i-1,j))^2 - \left[\frac{1}{(n(i-1,j)+1)} (e(i,j) - \hat{a}(i-1,j))\right]^2 \end{cases} \quad (17)$$

Equation (14) together with the result of equation (17) can then be used to estimate $\hat{a}(i,j)$. The equations for propagating the optimal path to the nodes in zones 1, 2 and 4 of current row C( ) are similar to equation (17).

FIG. 9 is a flow chart that illustrates function for the computation of the cost of optimal path to each node of the match region. In the flow, let IC be the row number of a match region currently being considered, NUN be the number of samples of s-signal, NT be the number of samples of p-signal, and LBUB be the number of samples of s-trace over which the path can begin where LBUB≦LBU.

When IC equals 1, the end points B2, E2 of the ICth row of the match region are computed. The paths are initialized over the nodes of 1 through LBUB. For the nodes from LBUB through E2, the computations are performed according to the nodes of zone 1. IC is incremented and the computations follow the flow as given in FIG. 9. Finally, when IC is equal to NT, the cost of the optimal paths to all nodes of the match region have been computed.

Figure 10:
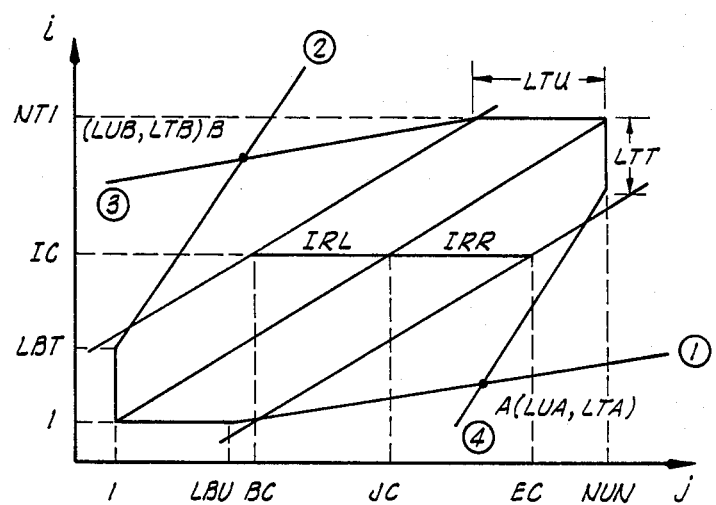
FIG. 10 is a graph illustrating the match region with no checkpoints.
Figure 11:
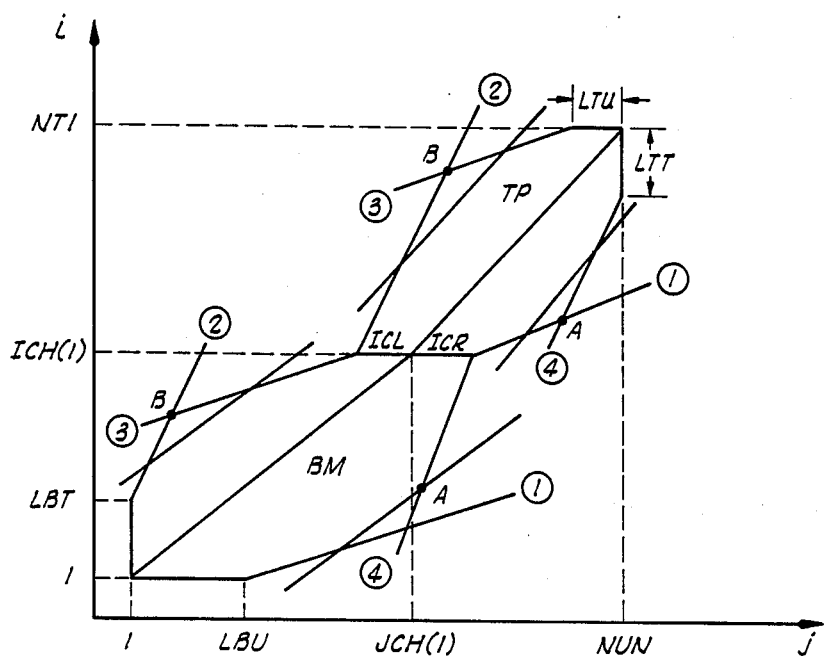
FIG. 11 is a graph illustrating the match region with one checkpoint.
Figure 12:
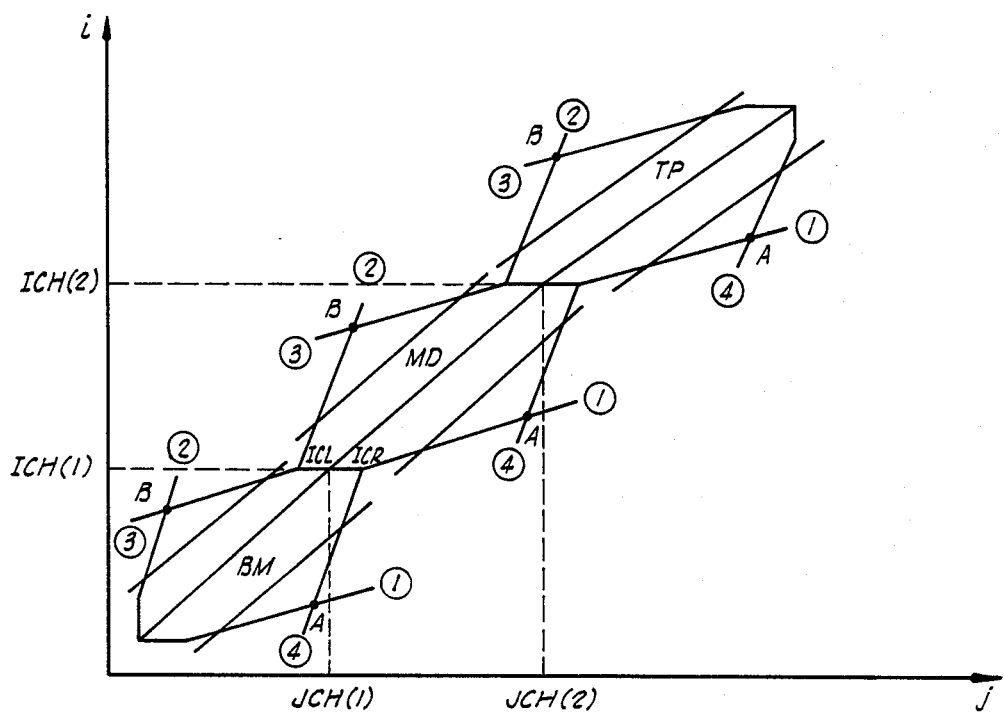
FIG. 12 is a graph illustrating the match region with two checkpoints.

The computation of end points of a row in the match region depend upon the number of checkpoints being used. The match regions with no checkpoints, one checkpoint or more than one checkpoint are shown in FIGS. 10, 11 and 12, respectively. The notation used in FIGS. 10, 11 and 12 is as follows:

IC—The row number of current row match region
NUN—Length of s-trace
NT1—Length of p-trace
SLD—Slope of main diagonal when there are no checkpoints
SMX—Maximum slope of match curve (slope of lines 2 and 4)
SMI—Mimimum slope of match curve (slope of lines 1 and 3)
LTB,LTA—Y-axis coordinates of intersection points B and A
IRL—Left side range from the diagonal
IRR—Right side range from the diagonal
NCH—Number of checkpoints
ICH(i)—Y-axis coordinates of checkpoint i
JCH(i)—X-axis coordinates of checkpoint i
ICL—Left side range at checkpoint
ICR—Right side range at checkpoint
BM—Bottom section
MD—Middle section
TP—Top section
BC—Beginning node of row C( )
EC—Ending node of row C( )

Figure 13:
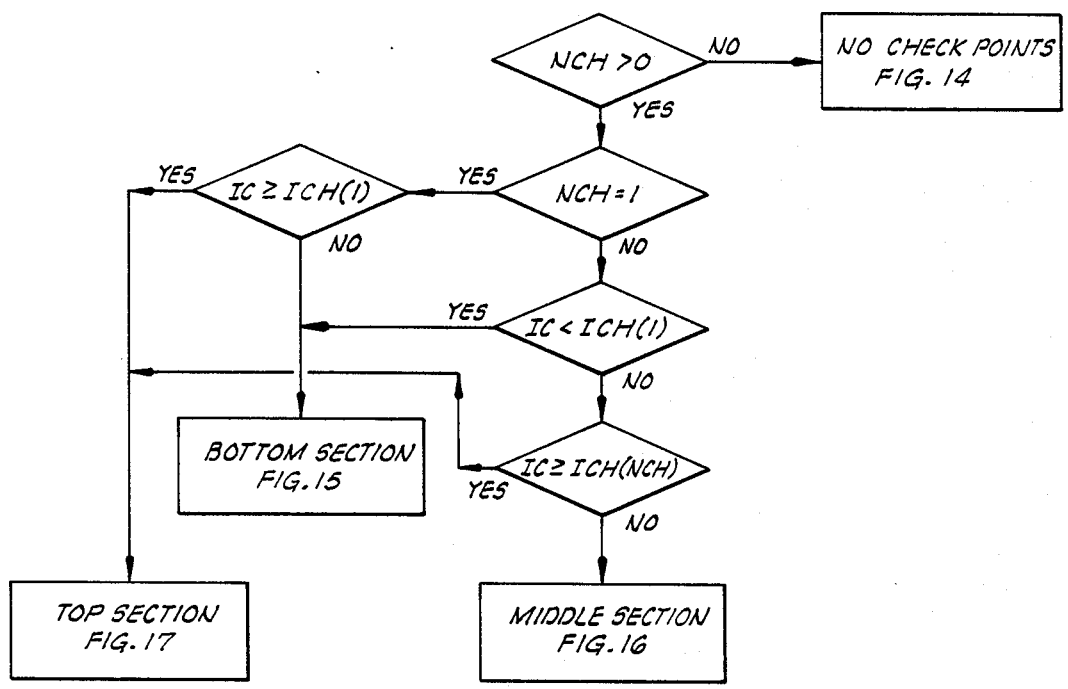
FIG. 13 is a flow chart for determining the match region section in which the current row lies.
Figure 14:
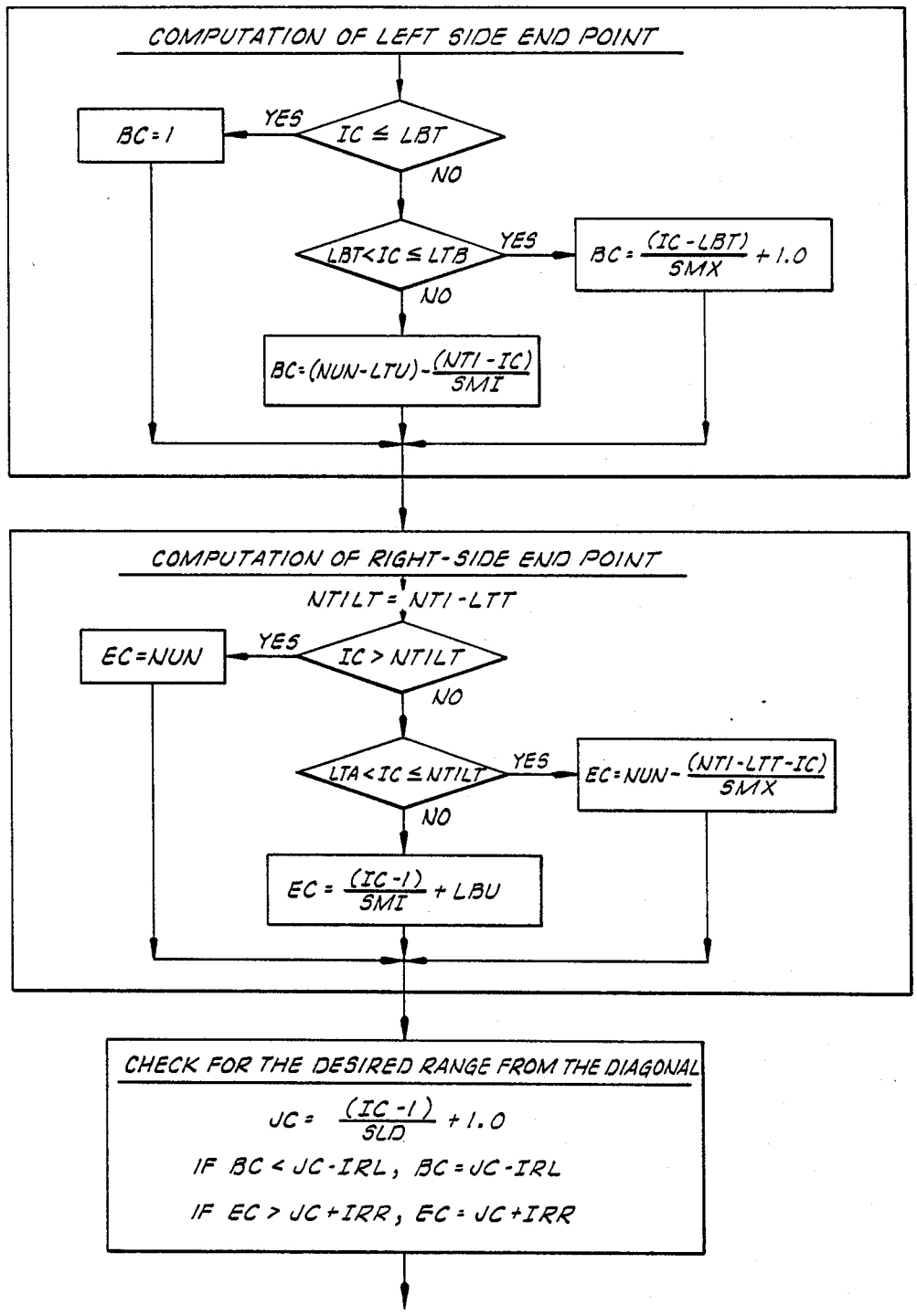
FIG. 14 is a flow chart for the computation of end points of current row when there are no checkpoints.

To compute the end points of a current row, the flow chart of FIG. 13 is used to determine the section of match region in which the current row lies. Referring then to FIG. 14, there is illustrated the flow diagram for computation of the end points BC and EC of the current row when there are no checkpoints. IC is compared with the y coordinate of the intersection point B. If IC is greater than LTB, the beginning point of the current row lies on line 3. If LBT is less than IC which is less than LTB, the beginning point of the current row lies on line 2. The ending point of the current row is computed by checking to see whether or nor IC lies on the line 1 or on line 4. The beginning and ending points are finally computed by taking into account the allowable ranges from the diagonal of the match region.

Figure 15:
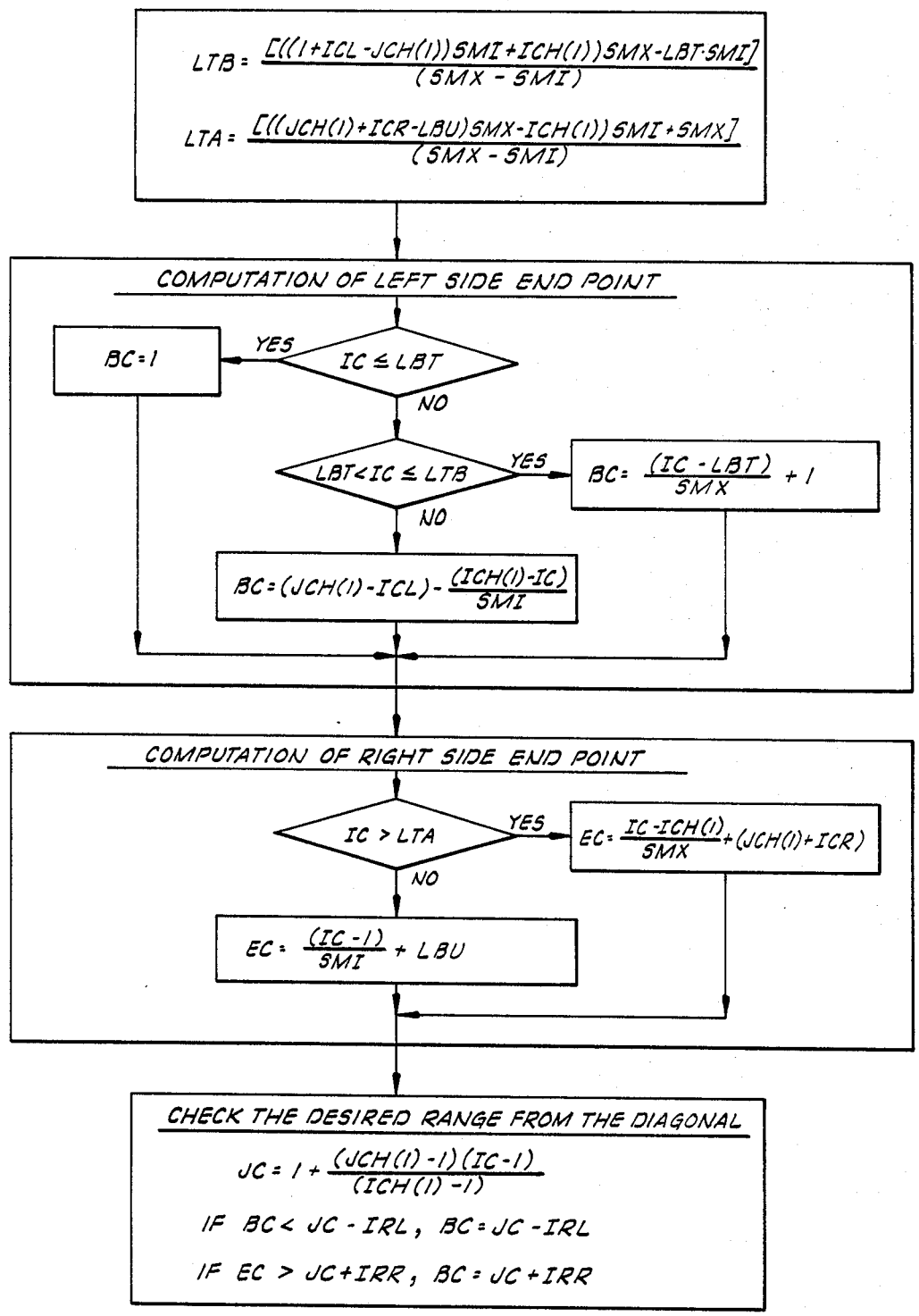
FIG. 15 is a flow chart for the computation of end points of current row when it lies in the bottom section of the match region.
Figure 16:
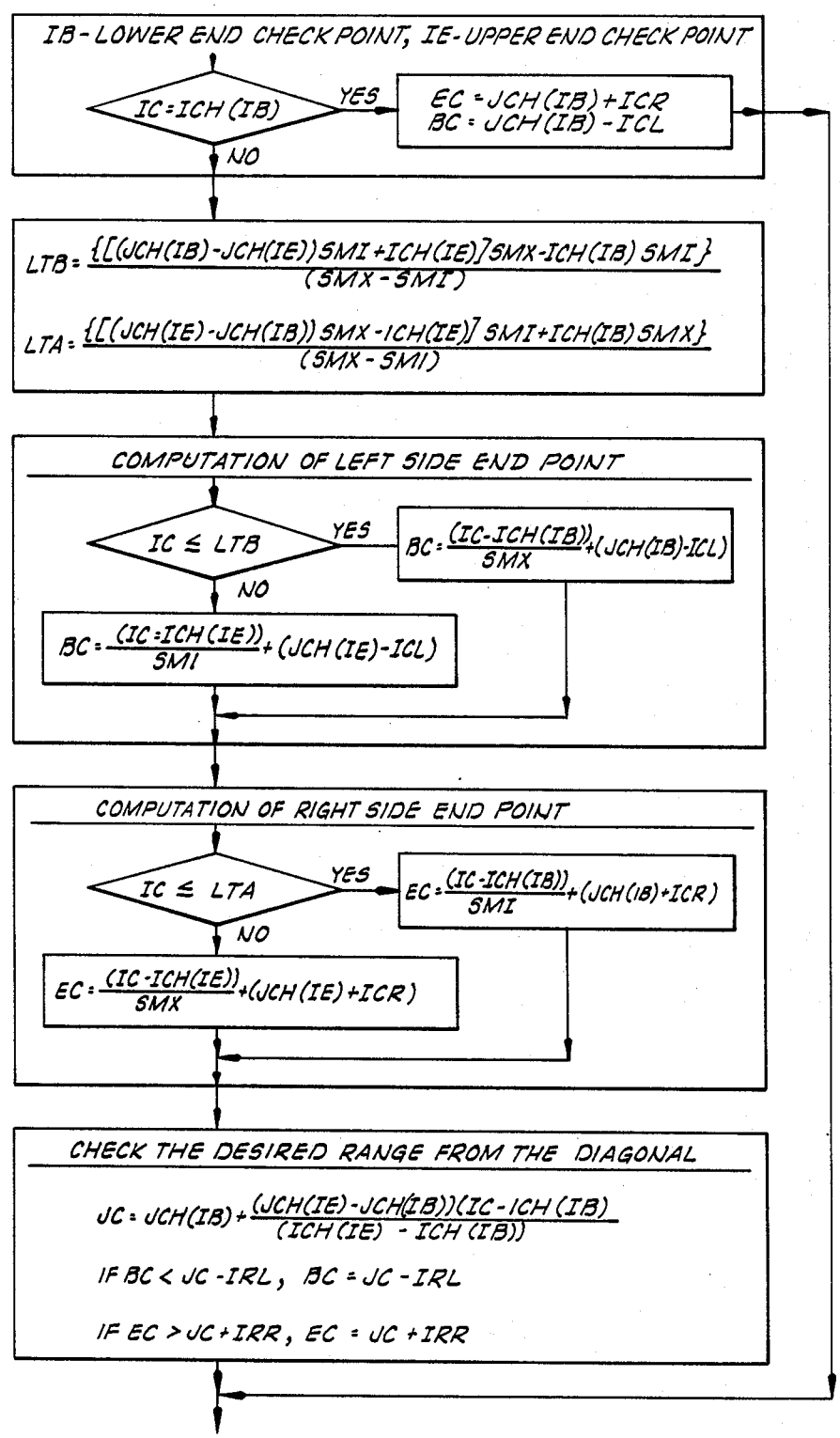
FIG. 16 is a flow chart for the computation of end points of a current row when it lies in the middle section of a match region.
Figure 17:
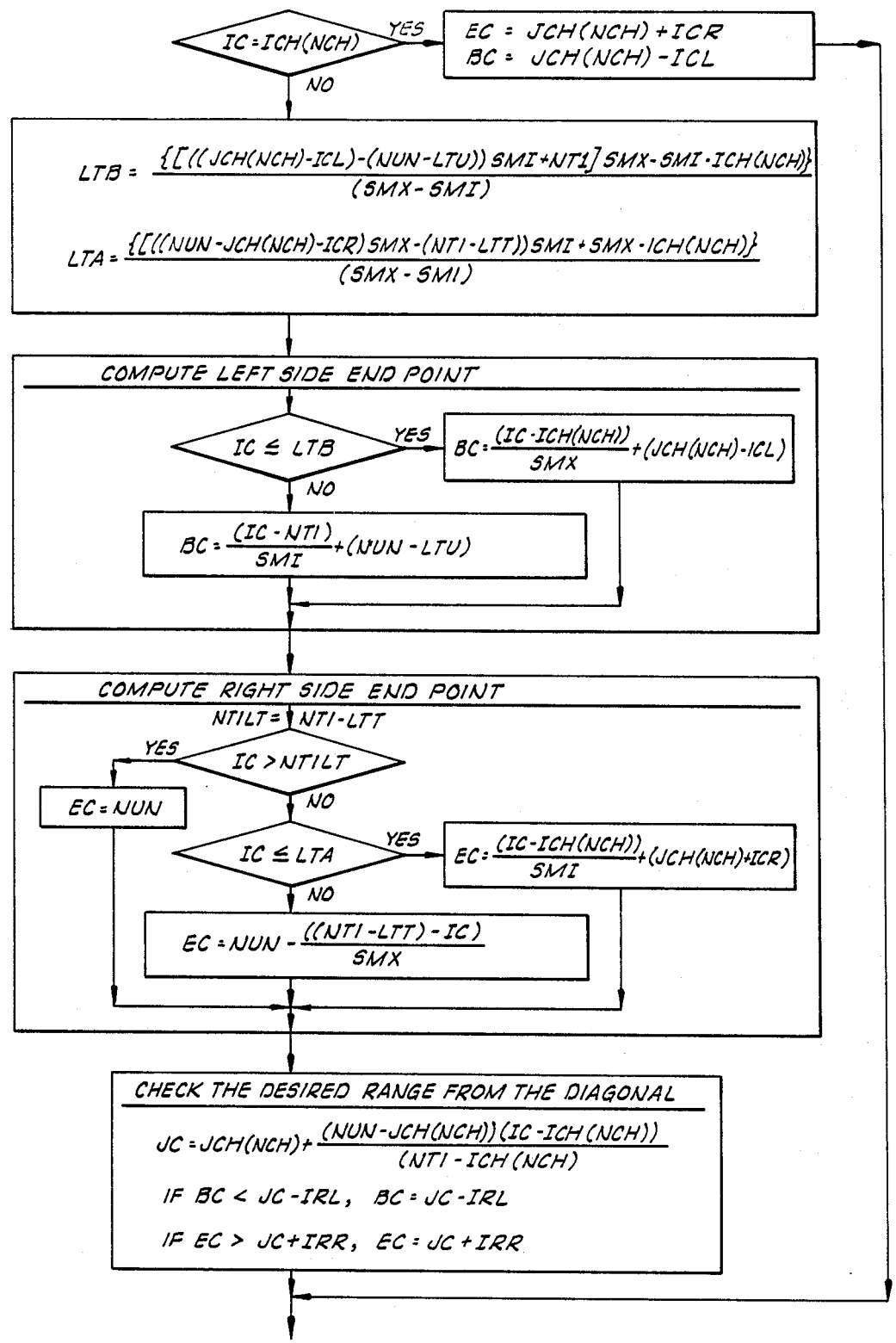
FIG. 17 is a flow chart for the computation of end points of a current row when it lies in the top section of a match region.

Thus, as FIG. 14 illustrates the flow for computation of end points for the current row of a match region when there are no checkpoints, the FIGS. 15, 16 and 17 set forth the flow diagram for computation of end points of the current row of match region when the row lies in a bottom match section, a middle section or a top section, respectively.

As an alternative, a generalized trace model may be utilized for propagating a sequential optimal path. Thus, instead of modeling the traces as prior discussed at equation (3), the signals p(t) and s(t) may be the stretched and scaled versions of each other and expressed in relative terms as $$S(t_s) = ap(t_p) + e(t) \quad (18)$$

where $t_s$ and $t_p$ are the coordinates of the node of match curve $\mu(t)$, and e(t) is an additive Gaussian noise factor with mean $\alpha$ and variance $\sigma^2$. Proceeding in similar manner to equation (5), the maximum likelihood estimate for 'a' can be obtained as $$a = \frac{\sum_t (S(t_s) - \alpha)p(t_p)}{\sum_t p^2(t_p)} \quad (19)$$

The estimates for the parameters $\alpha$ and $\sigma^2$ are given by equation (6). The criterion for the estimation of match curve $\mu(t)$ is the minimization of $\epsilon^2$ of equation (10). The principle of path optimality can then be used as before to propagate the optimal path sequentially. Let the optimal path from the beginning point B to a point $a_j$ in the local search region have n nodes; let $s_i$, $p_i$ and $e_i$ be the samples of s-trace, p-trace and the error e(t)

for an ith node of match curve; and, let $a_n$ be the estimate of a as given by $$a_n = \frac{MSP_n - \hat{a}_n MP_n}{MP2_n} \quad (20)$$

where $$MSP_n = \sum_{i=1}^{n} S_i P_i \quad (21)$$

$$MP_n = \sum_{i=1}^{n} P_i$$

and $$MP2_n = \sum_{i=1}^{n} P_i^2$$

The estimates of $\alpha_n$ and $\epsilon_n^2$ are given by equations (12) and (13). To extend the optimal path we now find that the estimates of parameters a and $\alpha$ are functions of each other. However, the following approximation can be used to sequentially propagate the optimal path. To extend the path to (n+m) nodes, the value $a_n$ is used to compute $$e_{n+i} = (S_{n+1} - a_n p_{n+i}), \quad 1 \leq i \leq m \quad (22)$$

The estimates for the parameters $\alpha_{n+m}$ and $\epsilon^2_{n+m}$ can be computed using equations (14)–(16). Thus, the estimate for $a_{n+m}$ can now be obtained as $$a_{n+m} = \frac{MSP_{n+m} - \hat{a}_{n+m} MP_{n+m}}{MP2_{n+m}} \quad (23)$$

where $$MSP_{n+m} = MSP_n + \sum_{i=1}^{m} S_{n+i} p_{n+i} \quad (24)$$

$$MP_{n+m} = MP_n + \sum_{i=1}^{m} p_{n+i}$$

and $$MP2_{n+m} = MP2_n + \sum_{i=1}^{m} p_{n+i}^2$$

The optimal path may now be extended using equation (11). An alternative approach would be to use $\hat{a}_n$ in equation (23) to estimate $a_{n+m}$. The errors are computed from equations (18) and (11), and equations (14)–(16) are used to extend the optimal path.

The optimal match curve is then estimated in flow stage 14 (FIG. 1) by tracing the optimal path through the match region. The uncertainty at the end point can be reduced by starting the end of the optimal path at a node in the range (NUN–LTTU) to NUN where the cost of the optimal path is minimum. The parameter LTTU defines the allowable range of nodes. The notation used in tracing the optimal path may be as follows:
NT—Number of rows of match region
NPT—Number of nodes on the optimal path
CU( )—x coordinates of nodes on the optimal path
CT( )—y coordinates of nodes on the optimal path
The detailed steps for computation are set forth in the flow chart of FIG. 18 for the estimation of optimal match curve.

An estimation of signal parameters or properties may be established flow-stage 16 (FIG. 1) since the match curve possesses information about the signals being matched. For example, the information can be used to estimate the parameters that are descriptive of signal properties such as $V_s V_p$ ratios. If we put p-trace on y-axis and s-trace on x-axis, the slope of the match curve gives an estimate of $V_s V_p$ ratio. This can be seen from the fact that the time of travel of p-wave times its velocity in a particular layer is equal to the time of travel of s-wave times its velocity in that layer. The slope of the match curve of mode converted signals can be used similarly to estimate the $V_s V_p$ ratios. Let $\Delta t_p$, $\Delta t_{ps}$ and $\Delta t_s$ be the two-way travel time in a given earth layer of p-wave, ps-wave and s-wave energy, respectively. Since the ps-observation is due to the fact that it traveled as a p-wave in the forward direction and returned as an s-wave after mode conversion, we can write $$\Delta t_{ps} = \tfrac{1}{2}[\Delta t_p + \Delta t_s] \quad (25)$$

Also, we have $$V_p \Delta t_p = V_s \Delta t_s \quad (26)$$

and $$V_p \Delta t_p = V_{ps} \Delta t_{ps} \quad (27)$$

Using equations (26) and (27) in equation (25), we get $$\frac{V_s}{V_p} = \frac{1}{((2/(V_{ps}/V_p)) - 1)} \quad (28)$$

Thus, if we put the p-trace on the y-axis and the ps-trace on the x-axis, the slope of the match curve gives an estimate of the $V_{ps}/V_p$ ratio. The $V_s/V_p$ ratio can then be estimated from the equation (28). Once the $V_s V_p$ ratio is estimated, the parameters most familiar to the geologist, i.e. Poisson's ratio, etc., can easily be derived from well-known velocity relationships.

The slope of the match curve can be continuously estimated by using an operator of certain size to approximate the match curve with the best fitted line in the least squares error sense and using the slope of the line as the slope estimate of the match curve. Since the interpreters will be most familiar with the p-data, we can use the p-axis as reference for all computations. FIG. 19 illustrates the continuous estimation of slope of a match curve using an operator of sample size $A_1B_1$ on the y-axis (p-data).

The operator is projected onto the match curve to define a neighborhood 40-1 and the beginning and ending points are computed for each such neighborhood. The slope is estimated and is assigned to the center sample $C_1$ of the respective neighborhood. The operator is moved by one sample point along the y-axis to yield a new neighborhood 40-n and the slope of the match curve is again estimated so that the parameters of the signals are successively estimated as continuous quantities.

Let a particular neighborhood have n nodes on the match curve, and let their coordinates be $\{(x_i, y_i), 1 \leq i \leq n\}$; then the slope $a_n$ of the best fit line to these nodes can be estimated from the following.

$$a_n = \frac{b_n}{c_n} \quad (29)$$

-continued $$\text{where } b_n = \sum_{i=1}^{n} (X_i - \overline{X}_n)(y_i - \overline{y}_n)$$

$$C_n = \sum_{i=1}^{n} (X_i - \overline{X}_n)^2$$

$$\overline{X}_n = \frac{1}{n} \sum_{i=1}^{n} X_i$$

$$\text{and } \overline{y}_n = \frac{1}{n} \sum_{i=1}^{n} y_i \qquad (30)$$

If we add a node $(x_{n+1}, y_{n+1})$ to the given set of nodes $(x_i, y_i)$, $1 \leq i \leq n$ the slope estimate can be updated with $$a_{n+1} = \frac{b_{n+1}}{C_{n+1}} \qquad (31)$$

$$\text{where } b_{n+1} = b_n + \frac{n}{(n+1)} (X_{n+1} - \overline{X}_n)(y_{n+1} - \overline{y}_n)$$

$$C_{n+1} = C_n + \frac{n}{(n+1)} (X_{n+1} - \overline{X}_n)^2$$

$$\overline{X}_{n+1} = \frac{n}{(n+1)} \overline{X}_n + \frac{1}{(n+1)} X_n$$

$$\text{and } \overline{y}_{n+1} = \frac{n}{(n+1)} \overline{y}_n + \frac{1}{(n+1)} y_n \qquad (32)$$

Similarly, if we remove a node $(x_n, y_n)$ from the given set of nodes, the slope estimate can be updated as follows.

$$a_{n-1} = \frac{b_{n-1}}{C_{n-1}} \qquad (33)$$

$$\text{where } b_{n-1} = b_n - \frac{n}{(n-1)} (X_n - \overline{X}_n)(y_n - \overline{y}_n)$$

$$C_{n-1} = c_n - \frac{n}{(n-1)} (X_n - \overline{X}_n)^2$$

$$\overline{X}_{n-1} = \frac{n}{(n-1)} \overline{X}_n - \frac{1}{(n-1)} X_n$$

$$\text{and } \overline{y}_{n-1} = \frac{n}{(n-1)} \overline{y}_n - \frac{1}{(n-1)} y_n \qquad (34)$$

The above two steps can be combined into a single step to reduce the computation still further in estimating the slope of match curve. Let $\{(x_i, y_i), 1 \leq i \leq n\}$ be the given set of n nodes, and denoting the estimates as identified with a single prime. Removing one node and adding one node to derive a new node set $\{(x_i, y_i), 2 \leq i \leq n+1\}$, the estimates can be denoted by values with double prime and estimates with single and double primes will be related as follows.

$$a_n'' = \frac{b_n''}{C_n''} \qquad (35)$$

where $$b_n'' = b_n' + \frac{(n-1)}{n} (X_{n+1} - \overline{X}_n')(y_{n+1} - \overline{y}_n') -$$

$$\frac{(n+1)}{n} (X_n - \overline{X}_n')(y_1 - \overline{y}_n') +$$

$$\frac{1}{n} [(X_{n+1} - \overline{X}_n')(y_1 - \overline{y}_n') + (X_1 - \overline{X}_n')(y_{n+1} - \overline{y}_n')] \qquad (36)$$

$$C_n'' = C_n' + \frac{(n-1)}{n} (X_{n+1} - \overline{X}_n')^2 -$$

$$\frac{(n+1)}{n} (X_1 - \overline{X}_n')^2 + \frac{2}{n} (X_1 - \overline{X}_n')(X_{n+1} - \overline{X}_n')$$

$$\overline{X}_n'' = \overline{X}_n' + \frac{1}{n} (X_{n+1} - X_1)$$

and $$\overline{y}_n'' = \overline{y}_n' + \frac{1}{n} (y_{n+1} - y_1)$$

The equations (29) through (36) can be used for very efficient computation of the slope estimates of the match curve. A flow chart for the continuous estimation of parameters such as $V_s/V_p$ ratios, Poisson's ratio, etc., using the information from the slope of the match curve is given in FIG. 20. The notation used in the flow chart is as follows:

LSM—Size of operator along p-axis
NPT—Number of nodes on the match curve
CT( )—Y coordinates of match curve nodes
ITL—Low end of CT( ) array
ITH—High end of CT( ) array
ICPL—Central point of first neighborhood on p-axis
ICPH—Central point of last neighborhood on p-axis
ING—Number of neigborhoods of size LSM along p-axis
ICPCN—Central point of current neighborhood on p-axis
IBPCN—Beginning point of current neighborhood on p-axis
IEPCN—Ending point of current neighborhood on p-axis
IBCNT—Beginning node of current neighborhood on match curve
IECNT—Ending node of current neighborhood on match curve
ZNP—Number of nodes of current neighborhood on match curve The final program flow stage 18 (FIG. 1) functions to generate selected ones of interpretive displays. The match curve relates the timings of one signal in comparison with those of another signal, and by using the match curve one of the signals can be non-linearly stretched or compressed relative to the other. This concept can then be used for the generation of various types of signal comparison display such as comparison of p-wave/s-wave sections, mode converted sections, etc.

The information in the match curve may be visually presented through plots of correlated signal slices as the p-trace or y-axis signal is divided into slices of selected time duration and thereafter matched with a corresponding slice of s-wave data as applied on the x-axis. Such matched slices may be displayed by including dead zones between the adjacent slices to further define points of interest. Such displays serve to show the events that are matched and the variability in the matching from trace to trace and such presentations can be very useful for quality control purposes.

The $V_s/V_p$ ratios, Poisson's ratio, etc. are estimated as continuous quantities and can be used to generate displays of color overlays in combination with the well-known p-wave section. These displays allow the interpreter to have the generally useful p-wave section while at the same time additional information is provided by the color coding of the overlay as derived from counterpart s-wave or mode converted section data. Thus, there is enabled yet another tool to aid the interpreter in tracking zones of interest for detection of hydrocarbon targets.

Figure 21:
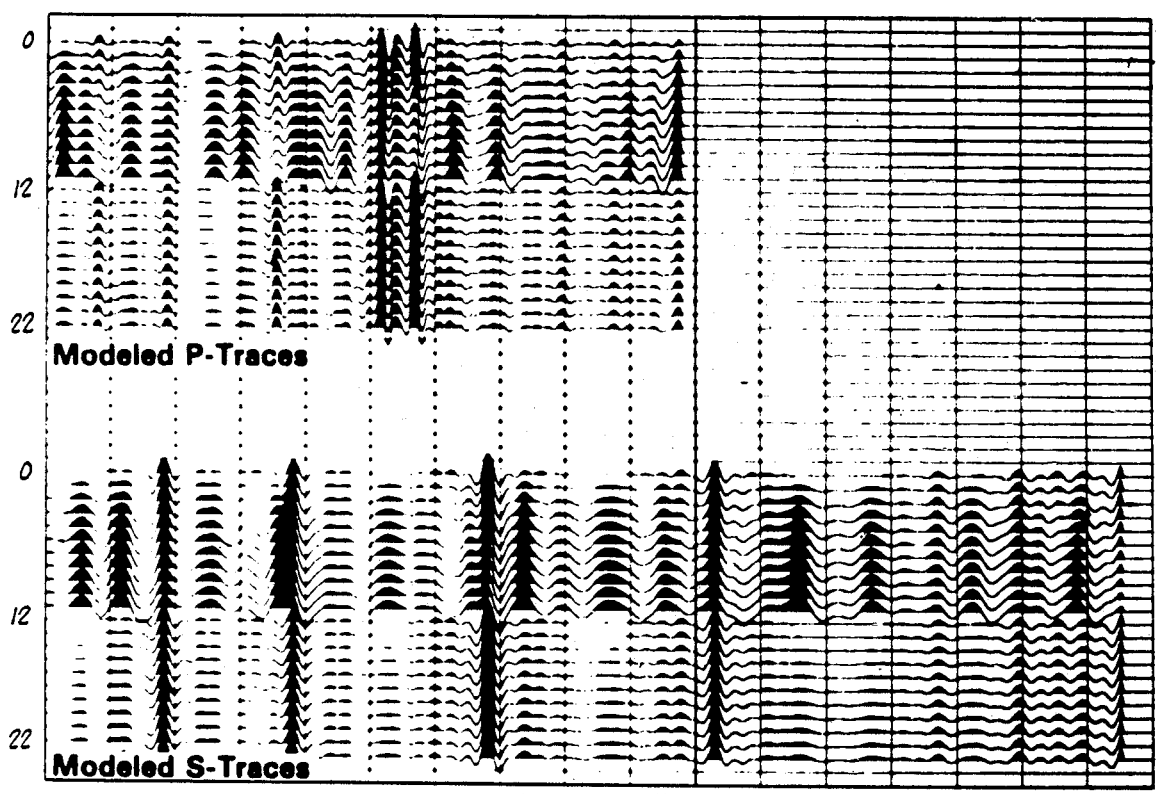
FIG. 21 illustrates the modeled p-wave and s-wave seismic sections.

Results obtained using the computational steps of the flow chart of FIG. 1 are presented in the form of specific printouts of both real and synthetic data. FIG. 21 illustrates modeled p-trace and s-trace sections, twenty-two traces in each section. Varying amounts of noise have been added to the traces and it may be noted that the twelfth trace is relatively noise-free. The signal power is defined as the sum of squares of the signal sample values; and, increments of 0.1 times the signal power is added as noise from the twelfth trace to the twenty-second trace so that the twenty-second trace has a signal-to-noise ratio of unity. The first trace has a signal-to-noise ratio of unity and the eleventh trace has a signal-to-noise ratio of 0.5.

Figure 22:
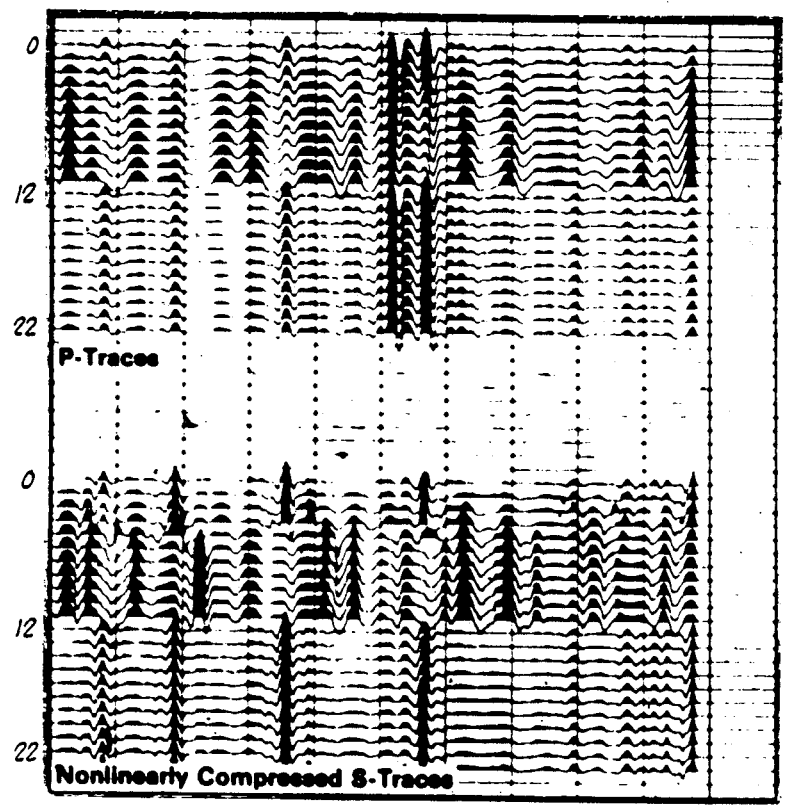
FIG. 22 is a display for the comparison of modeled p-wave and non-linearly compressed s-wave sections.

Thus, the corresponding modeled p-traces and s-traces are matched and the match curves are estimated; and, using the match curve, the s-traces are non-linearly compressed to the time axis of the p-traces as shown in FIG. 22. It can be observed from this illustration that the present process is quite effective for use in the presence of noise. A significant alignment of meaningful events may be noted.

Figure 23:
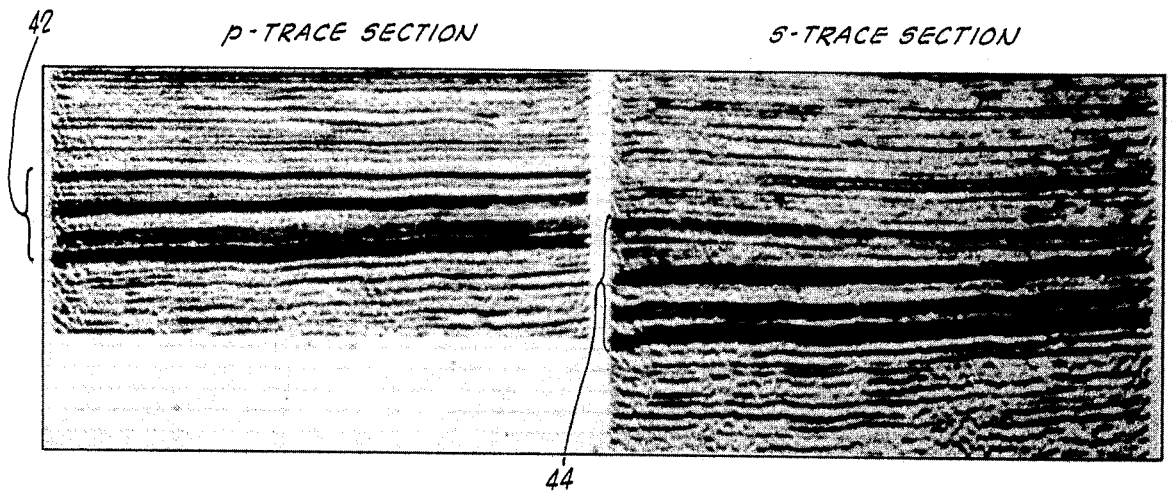
FIG. 23 shows the real p-wave and s-wave sections of a seismic line.
Figure 24:
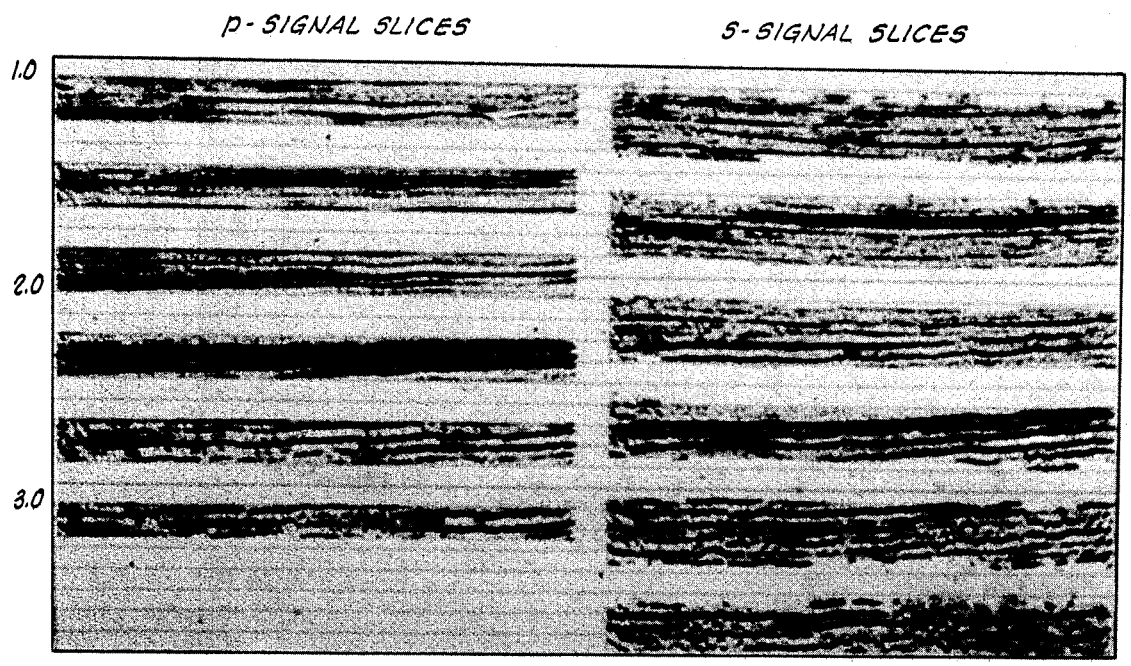
FIG. 24 is a correlated signal slice plot of p-wave and s-wave sections.
Figure 25:
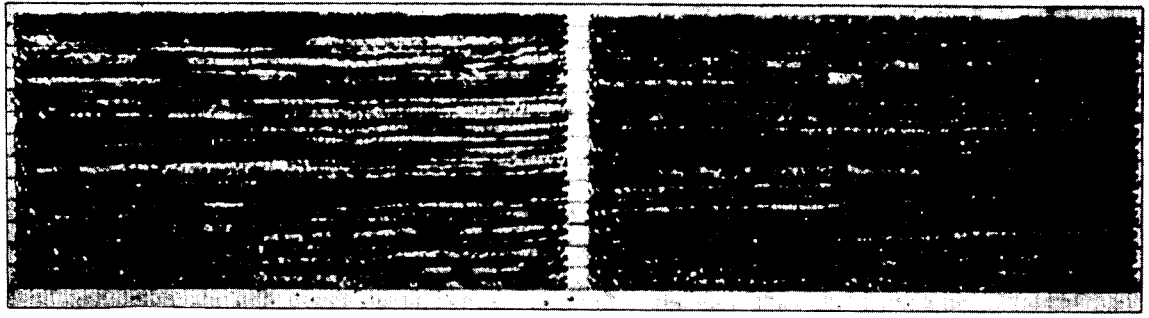
FIG. 25 is a display for the comparison of p-wave and non-linearly compressed s-wave sections.

Real p-wave and s-wave seismic sections, each of the same survey line, are shown in FIG. 23, i.e. surface distance vs. depth in time, wherein corresponding horizon groups 42 and 44 have been identified using prior well information derived from the area. Such horizon groups may be presented or defined in color. The timings of selected horizons of the group are digitized for use as a checkpoint in the estimation of match curve corresponding p-traces and s-traces. A correlated signal slice display of the data is depicted in FIG. 24 which clearly shows the events that are matched and the variations in the match curve estimates from trace to trace. It may be noticed that the quality of matching is extremely good. The s-traces are non-linearly compressed to the time axis of the p-traces as shown by the signal comparison display of FIG. 25. It can be noticed that the process exhibits good ability to compress the s-traces to a close match of the p-traces albeit a non-linear relationship.

Figure 26:
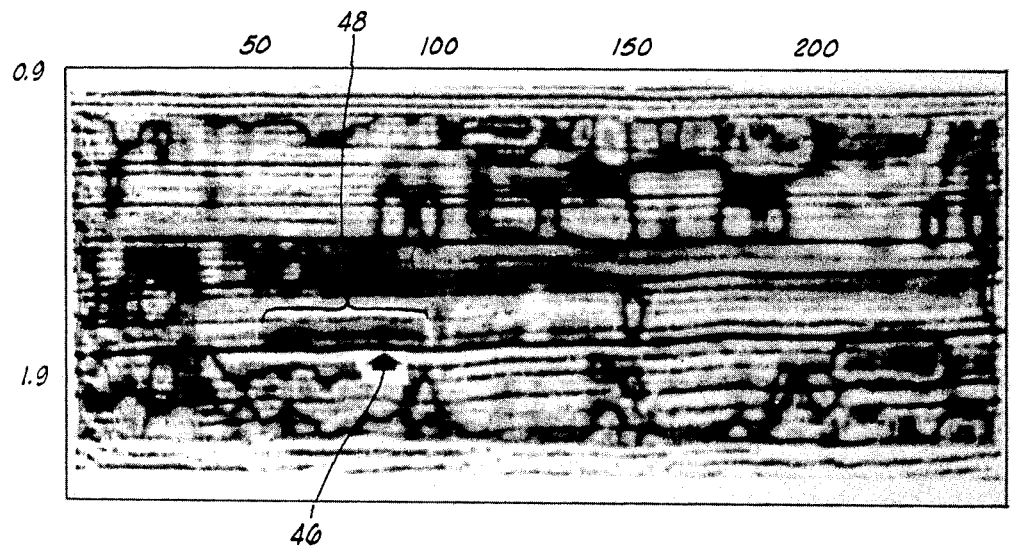
FIG. 26 illustrates a color overlay of continuous $V_s/V_p$ ratios estimated from p-wave and s-wave sections on a p-wave section.

The $V_s/V_p$ ratios may then be computed as continuous quantities for overlay in color on the p-section as illustrated in FIG. 26. For the horizon at 1.9 seconds, the $V_s/V_p$ ratios estimated by signal matching are compared with the $V_s/V_p$ ratios computed by horizon digitization. They agree well and this result is verified by a gas producing well that is known near the survey line. The location of the well projection onto the line is indicated by the arrow 46 and one can also note the high $V_s/V_p$ ratios there is the producing zone. The color overlay is graded from 0.700 to 0.350 $V_s/V_p$ ratio in color scale ranging from red through orange and green to blue. A large red portion 48 verifies the gas zone near arrow 46, and various yellow and blues areas, otherwise define the stratum in terms of $V_s/V_p$.

Figure 27:
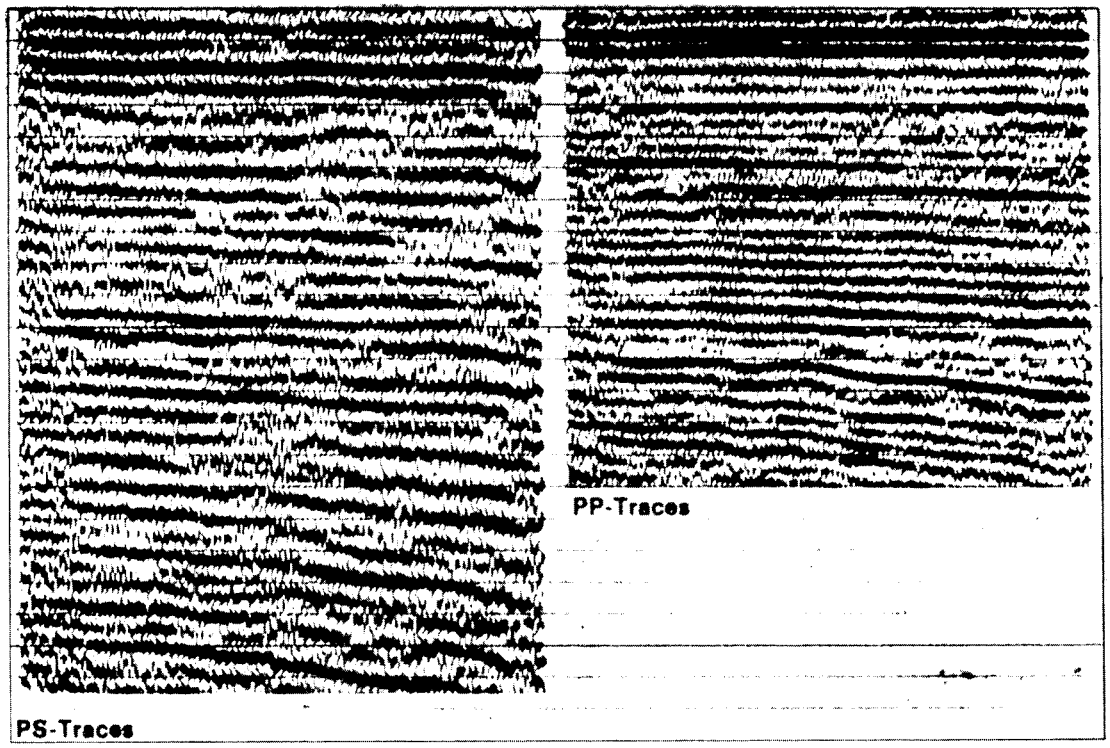
FIG. 27 illustrates PP- and PS-sections of a seismic line.
Figure 28:
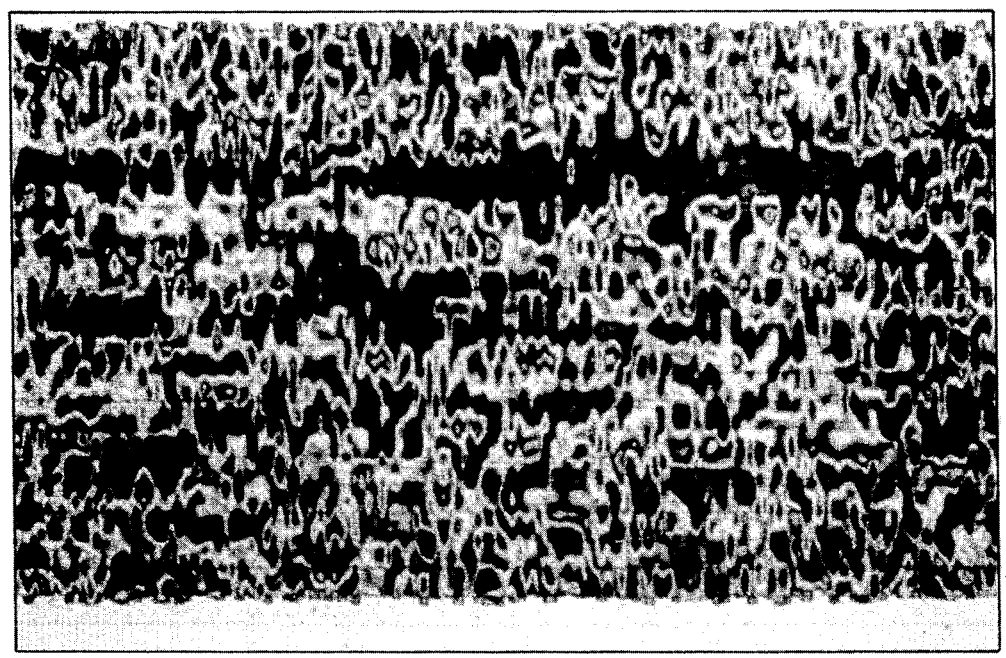
FIG. 28 illustrates a color overlay of continuous $V_s/V_p$ ratios estimated from PP- and PS-sections on a PP-section.
Figure 29:
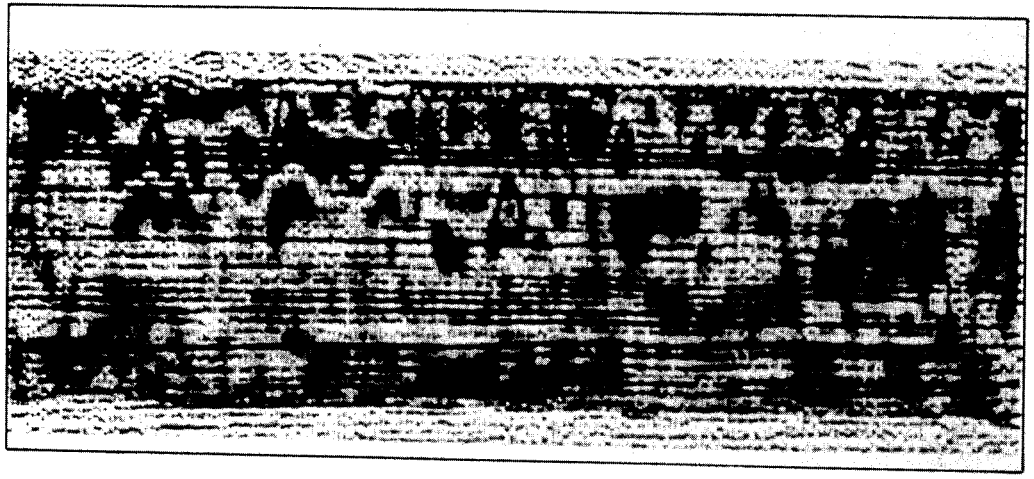
FIG. 29 shows the color overlay of continuous Poisson's ratio estimated from PP- and PS-sections on a PP-section.
Figure 30:
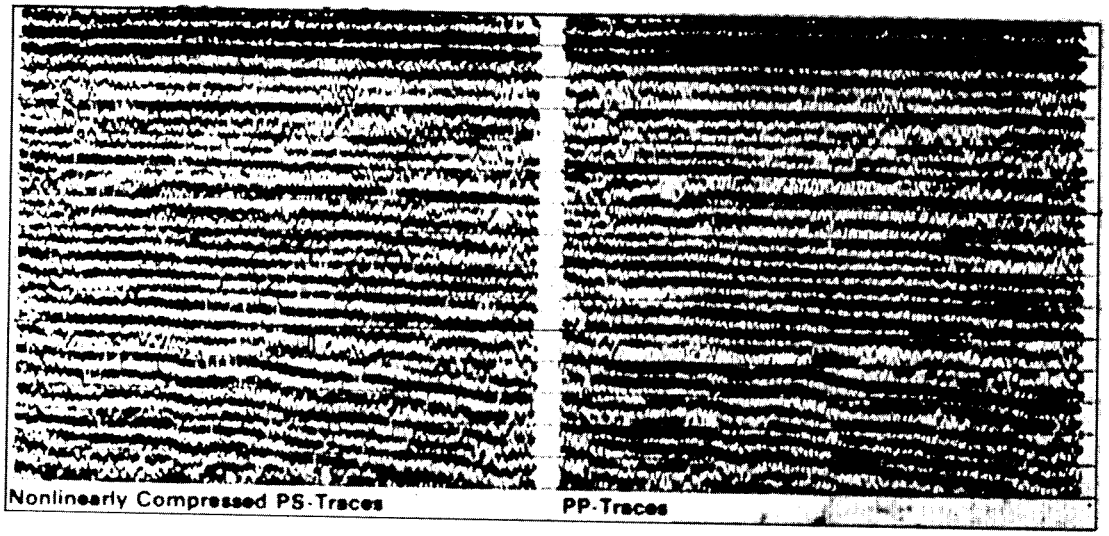
FIG. 30 is a display for the comparison of a PP-section with the non-linearly compressed PS-section.

The process also applies equally well for display of mode converted data. The PP-sections and PS-sections of a survey line are shown in FIG. 27. The equations (27) and (28) are used to estimate continuous $(V_s/V_p)$ ratios and Poisson's ratios from the slope estimates of the related match curve, and this is illustrated by color overlays on the PP-section as shown in black and white FIGS. 28 and 29, respectively. The non-linearly compressed PS-traces relating to the time axis of PP-traces is illustrated in FIG. 30. It may be observed again that the ability of the process to compress the mode converted PS-traces is quite effective to bring about a match with the PP-traces.

The non-linear signal matching process may also be used to match sonic log data to seismic traces. The seismic traces are non-linearly stretched to match with the log data and results of such comparison are shown in FIG. 31. Particularly observe the good match of the events at the ninth, eleventh and fifteenth timing lines from the left.

Alternatively, a still further processing refinement can be utilized wherein phase data is included in computation of the optimal path. The local dependency information of the signal samples or the phase of the signals can be incorporated in the estimation of the match curve by modeling the dependencies of errors of equation (3). Markov models can be used to model the dependencies. In the following analysis, first order Markov dependency modeling is used and in the higher order dependencies can similarly be taken into account. The first order dependencies of the errors can be mathematically stated as $$p(e(i+1)|e(1),e(2),\ldots e(i)) = p(e(i+1)|e(i)) \tag{37}$$

where p(x) is the probability of x. Assuming the errors are Gaussian with mean $\alpha$ and the variance $\sigma^2$, and modeling the dependencies as in equation (37), the logarithmic likelihood function can be written as $$LL = -\frac{(n-1)}{2} \log[\sigma^2(1-\rho^2)] - \frac{1}{2\sigma^2(1-\rho^2)} \sum_{i=1}^{n-1} \tag{38}$$

$$[(e(i+1) - \rho e(i) - \alpha(1-\rho)]^2 + \text{a constant}$$

where the parameter $\rho$ contains the correlation information of errors of adjacent nodes. The maximum likelihood estimates for the parameters $\alpha$, $\sigma^2$ and $\rho$ can be obtained from equation (38) as $$\hat{\alpha} = \frac{1}{(n-1)(1-\rho)} \sum_{i=1}^{n-1} (e(i+1) - \rho e(i)) \tag{39}$$

$$\sigma^2 = \frac{1}{(1-\rho^2)(n-1)} \{I\} \tag{40}$$

$$\text{and } \hat{\rho} = \frac{\sum_{i=1}^{n-1}(e(i+1) - \hat{\alpha}_2)(e(i) - \hat{\alpha}_1)}{\sum_{i=1}^{n-1}(e(i) - \hat{\alpha}_1)^2} \tag{41}$$

where $$\{I\} = \left[\sum_{i=1}^{n-1}(e(i+1) - \hat{\alpha}_2)^2\right] - \tag{42}$$

$$\frac{\sum_{i=1}^{n-1}(e(i+1) - \hat{\alpha}_2)(e(i) - \hat{\alpha}_1))^2}{\left(\sum_{i=1}^{n-1}(e(i) - \hat{\alpha}_1)^2\right)}$$

$$\hat{\alpha}_1 = \frac{1}{(n-1)} \sum_{i=1}^{n-1} e(i) \tag{43}$$

-continued
and $$\hat{a}_2 = \frac{1}{(n-1)} \sum_{i=1}^{n-1} e(i+1) \quad (44)$$

Substitution of equations (39)–(44) in equation (38) yields the following expression for the log likelihood function as a function of the match curve.

$$LL^2(\mu(t)) = -\frac{(n-1)}{2} \log \{I_1(\mu(t))\} + \text{a constant} \quad (45)$$

where $$I_1(\mu(t)) = \left[ \frac{1}{(n-1)} \sum_{i=1}^{n-1} (e(i+1) - \hat{a}_1)^2 \right] \quad (46)$$

$$\left[ 1 - \frac{\left( \sum_{i=1}^{n-1} (e(i+1) - \hat{a}_2)(e(i) - \hat{a}_1) \right)^2}{\left\{ \sum_{i=1}^{n-1} (e(i+1) - \hat{a}_2)^2 \right\} \left\{ \sum_{i=1}^{n-1} (e(i) - \hat{a}_1)^2 \right\}} \right]$$

Since the logarithm is a monotonic function of its argument, the criterion for the estimation of the stretch function will be minimization of the quantity $I_1(\mu(t))$ of equation (46). The aforesaid quantity is a product of two parts, the first part being similar to equation (9) and a second part that takes the correlation information of ajdacent errors into account in estimation of the stretch function $\mu(t)$. The principle of path optimality of equation (11) can then be employed for the efficient estimation of match curve when using the equation (46).

It is also desirable to establish an additional criterion for the quality of match. The quality of estimates can be evaluated by examining the variance of the estimates. It is difficult to obtain expressions for the variance of the estimates, but useful information about the variance of the estimates can be obtained in terms of Cramer-Rao lower bounds. Estimated variance of the erros can be used as a parameter for evaluation the quality of match as set forth below. The Cramer-Rao lower bounds are given as $$\text{Var}(\hat{\sigma}^2_{ML}) \geq \frac{1}{E\left[\left\{ \frac{\partial}{\partial \sigma^2} [\log(LL)] \right\}^2\right]} \quad (47)$$

$$\geq \frac{-1}{E\left\{ \frac{\partial^2}{\partial (\sigma^2)^2} [\log(LL)] \right\}} \quad (48)$$

using equations (6) and (47), we get $$\text{Var}(\hat{\sigma}^2_{ML}) \geq \frac{2n\sigma^4}{[n^2 + (n-1)(n-2)]} \quad (49)$$

from equation (6) and (48), we obtain $$\text{Var}(\hat{\sigma}^2_{ML}) \geq \frac{2\sigma^4}{(n-2)} \quad (50)$$

and using equations (48) and (40), we get $$\text{Var}(\hat{\sigma}^2_{ML}) \geq \quad (51)$$

$$\frac{2\sigma^4(1-\rho^2)(n-1)}{[(n-1)(n-3) - \rho^2(n-3)(n-5) - 4\rho^3(n-2)]}$$

Similar expressions can readily be obtained for the variances of the other estimated parameters, and these can be used to evaluate the quality of match thereby further to refine output result.

Yet another use of the generated match curve is in derivation of p-wave and s-wave reflection information. Consider a layer i on the top side and layer (i+1) on the lower side of an interface i. The p- and s-reflection coefficients can be written as $$R_{p,i} = \frac{V_p(i+1)\rho(i+1) - V_p(i)\rho(i)}{V_p(i+1)\rho(i+1) + V_p(i)\rho(i)} \quad (52)$$

and $$R_{s,i} = \frac{V_s(i)\rho(i) - V_s(i+1)\rho(i+1)}{V_s(i)\rho(i) + V_s(i+1)\rho(i+1)} \quad (53)$$

where $V_p(i)$, $V_s(i)$ and $\rho(i)$ are the p-wave velocity, s-wave velocity and density of layer i, respectively. Let $\beta_i$ be the ratio of the $V_s/V_p$ ratios of the upper and lower layers of interface i such as $$\beta_i = \frac{V_s(i)}{V_p(i)} \cdot \frac{V_p(i+1)}{V_s(i+1)} = \frac{V_{sp}(i)}{V_{sp}(i+1)} \quad (54)$$

where $V_{sp}(i)$ is the $V_s/V_p$ ratio of layer i. From equations (52)–(54), we get $$\beta_i = \frac{(1 + R_{p,i})(1 + R_{s,i})}{(1 - R_{p,i})(1 - R_{s,i})} \quad (55)$$

By expanding equation (55) in a Taylor's series and retaining only the linear terms, we derive $$\beta_i = 1 + R_{p,i} + R_{s,i} \quad (56)$$

and substitution of equation (54) into the equation (56) yields $$R_{p,i} + R_{s,i} = \frac{V_{sp}(i) - V_{sp}(i+1)}{V_{sp}(i+1)} \quad (57)$$

In light of the technique for estimation of the signal properties, flow stage 16 of FIG. 1, and equations (25) through (36), and the above equation (57), a match curve can be derived for use in estimating the sum of p-wave and s-wave reflection co-efficients for selected interpretation purposes.

In general, there are a great number of seismic processing operations that can utilize non-linear signal matching to bring about signal enhancement and improved data quality. Normal moveout correction and migration are two typical processing steps that require continuous velocity information, and surface consistent statics estimation is a typical processing step that can benefit from more accurate signal correlation. As discussed above, the present method is very useful in $V_s/V_p$ ratio estimation and enables finding of continuous ratios for display and output with color overlay or other attribute enhancement.

There are various other geophysical processes wherein non-linear signal matching can be a valuable tool as in extraction of elastic constants from multicomponents and multisensor data. Elastic constants of earth contain necessary information about the geological structures in the subsurface and the petrophysical properties of the rocks, and these can be computed from the density of the material, velocity ratio of the compressional and shear waves and the compressional or shear wave velocity. Non-linear signal matching can effectively use such data to estimate the related quantities. The process of the present invention can be readily applied in still other applications such as continuous extraction of RMS and interval velocities, and various correlations such as between well-log data to well-log data, and other time varying functions of similarly affected data.

The foregoing discloses a novel method for comparison of non-linearly related time analog signals. While the method is exemplified in usage to compare seismic energy trace signals of various types, e.g. compressional and shear waves, related well log data, mode-converted waves, etc., it should be understood that the non-linear signal matching or correlation process is effective for comparison of any time analog signals that owe their mathematically related signal characteristics to similar response within the same medium or effector. The technique identifies any common signals or points between two signals that have a physical relationship. Such processing is effective in many seismic processing modes such as velocity comparison, static trace correction as well as non-linear signal comparison in other technologies.

Changes may be made in combination and arrangement of procedures as set forth in the specification and shown in the drawings; it being understood that such changes come within the spirit and scope of the present invention.

The embodiments of the invention in which an exclusive property or privilege is claimed are defined as follows:

1. A method of signal matching for seismic signals containing a time analog response to reflection of seismic energy from an earth structure, the time analog response for the earth structure having a differing, non-linearly related time base in the signals, comprising:
   (a) storing first and second seismic signals that have been generated as a time analog response to a source of seismic energy transmitted into the earth and reflected by earth structure;
   (b) processing said first and second seismic signals to correlate the time analog response to the same earth structure and deriving optimal match curve data that relates the time base of the first seismic signal to the time base of the second seismic signal over the time range of said first and second seismic signals;
   (c) converting the first and second seismic signals as a function of the optimal match curve data to estimate an output parameter data signal descriptive of a combined property of said first and second seismic signals to time analog responses from the same earth structure at differing time bases; and
   (d) displaying said output parameter data signal to generate a visual display of the time and magnitude of the output parameter data signal.

2. A method as set forth in claim 1 wherein:
said first and second seismic signals are time analog responses for seismic energy of different vibratory modes.

3. A method as set forth in claim 1 wherein:
said first and second seismic signals are p-wave and s-wave seismic signals, respectively.

4. A method as set forth in claim 3 which further comprises:
deriving the slope of the optimal match curve data to indicate the ratio of shear-wave velocity to compressional wave velocity as the output parameter data signal.

5. A method as set forth in claim 1 wherein;
said first and second seismic signals are p-wave and mode converted s-wave seismic signals, respectively.

6. A method as set forth in claim 5 which further comprises:
deriving the slope of the optimal match curve data to indicate the ratio of velocity of mode converted energy to compressional wave seismic energy as the output parameter data signal.

7. A method as set forth in claim 1 which further includes:
normalizing the stored first and second seismic signals.

8. A method as set forth in claim 1 which further includes:
processing a plurality of first related seismic signals and a plurality of second related seismic signals to develop said first and second seismic signals for storing.

9. A method as set forth in claim 8 which further includes:
normalizing the stored first and second seismic signals.

10. A method as set forth in claim 1 wherein said step of deriving optimal match curve data, comprises:
processing successive samples of said first and second seismic signals to derive match curve data;
establishing global constraints to contain the match curve data; and
estimating the optimal match curve data.

11. A method as set forth in claim 10 wherein said step of converting the first and second seismic signals comprises:
estimating the ratio of seismic shear wave velocity to seismic compressional wave velocity.

12. A method as set forth in claim 10 wherein said step of converting the first and second seismic signals comprises:
estimating different offset seismic signal data to effect moveout correction.

13. A method as set forth in claim 10 which further includes:
normalizing both the amplitudes and the time length of the first and second seismic signals.

14. A method as set forth in claim 10 wherein:
the step of estimating optimal match curve data uses the criterion of the maximum log likelihood function.

15. A method as set forth in claim 1 wherein said step of processing said first and second seismic signals and deriving optimal match curve data comprises:
processing successive samples of said first and second seismic signals to derive a local search region defining a plurality of nodes of a possible match curve signal and computing the cost of the optimal paths to the nodes of the match region; and estimating the optimal match curve data signal that best relates the time bases of said first and second seismic signals.

16. A method as set forth in claim 15 wherein:

said costs of optimal paths to each node of a match region are computed using the principle of path optimality and the criterion of maximization of likelihood function.

17. A method as set forth in claim 16 which further includes:

normalizing both the amplitude and the time length of the first and second seismic signals.

18. A method as set forth in claim 16 wherein:

a priori data relating to the first and second seismic signals is processed to establish check point data relative to the optimal match curve data.

19. A method as set forth in claim 18 wherein: a plurality of checkpoints are processed to establish each match curve sample.

20. A method as set forth in claim 16 wherein:

phase information of the first and second seismic signals is accounted for in deriving the optimal match curve data by using a criterion for maximum log likelihood function for any stretch function between the first and second seismic signals.

21. A method as set forth in claim 16 which further includes:

deriving the estimated variance of error for each successive sample to establish a criterion for quality of match.

22. A method as set forth in claim 15 wherein:

said first and second seismic signals are time analog responses for seismic energy of different vibratory mode.

23. A method as set forth in claim 22 which further includes:

determining the slope of the match curve data signal to derive a continuous $V_s/V_p$ ratio estimation.

* * * * *